United States Patent
Morishita et al.

(10) Patent No.: US 7,329,718 B2
(45) Date of Patent: Feb. 12, 2008

(54) AROMATIC POLYCARBONATE RESIN, PROCESS FOR PRODUCING THE SAME, OPTICAL-PART MOLDING MATERIAL, AND OPTICAL PART

(75) Inventors: Hironobu Morishita, Chiba (JP); Hiroyuki Tamura, Chiba (JP); Yasushi Hamada, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 11/494,704

(22) Filed: Jul. 28, 2006

(65) Prior Publication Data

US 2006/0270823 A1    Nov. 30, 2006

Related U.S. Application Data

(63) Continuation of application No. 10/501,882, filed on Aug. 24, 2004, now Pat. No. 7,112,644.

(51) Int. Cl.
*C08F 64/00*    (2006.01)
(52) U.S. Cl. ............... 528/196; 264/176.1; 264/219; 359/642; 528/198; 528/268
(58) Field of Classification Search ............ 264/176.1, 264/219; 359/642; 528/196, 198, 268
See application file for complete search history.

(56) References Cited

U.S. PATENT DOCUMENTS

| 3,516,969 | A | * | 6/1970 | Hoagland et al. ............ 528/201 |
| 3,594,427 | A | * | 7/1971 | Moore ......................... 568/719 |
| 6,222,001 | B1 | * | 4/2001 | Day et al. .................... 528/196 |
| 6,291,631 | B1 | * | 9/2001 | Lemmon et al. ............. 528/196 |

FOREIGN PATENT DOCUMENTS

| JP | 05-078467 | 3/1993 |
| JP | 05-093057 | 4/1993 |

OTHER PUBLICATIONS

Papava, G. Sh. et al.; "Polycarbonates with adamantane cardo grups" Database CA Online; Chemical Astracts Service, Columubs, OH, US; XP0023675095 retrieved from STN Database accession No. 88:170527 & Soobshcheniya Akademii Nauk Gruzinskoi SSR, 88(3), 597-600 Coden: Saknah; ISSN: 0002-3167, 1977, XP002367097.

Geiger, C.C., Davies J.D., Daly W.H., "Aliphatic-aromatic copolycarbonates derived from 2,2,4,4-tetramethyl I-1, 3-cyclobutanediol" Journal of Polymer Science: Part A: Polymer Chemistry, vol. 33, 1995, pp. 2317-2327, XP002366972, Tables I-III.

Papava, G. Sh. et al, "Study of the mechanical and electrical properties of polyesters containing cardo groups of adamantane," Soobshcheniya Akademii Nauk Gruzinskoi SSR, 1983, 111(3), 521-4.

* cited by examiner

*Primary Examiner*—Terressa Boykin
(74) *Attorney, Agent, or Firm*—Steptoe & Johnson LLP

(57) ABSTRACT

The present invention relates to an aromatic polycarbonate resin which comprises repetitive units originating in residual groups of a 2,2-bis(4-hydroxyphenyl)adamantane compound and a 1,3-bis(4-hydroxyphenyl)adamantane compound having a substituent on an aromatic ring and which is excellent in a transparency, a heat resistance and a mechanical strength and has a good moldability and a production process for the aromatic polycarbonate resin described above in which the adamantane compounds described above are reacted with a carbonic ester-forming compound. Further, it relates to an aromatic polycarbonate resin which is excellent in an optical characteristic and an optical part prepared by molding the same.

12 Claims, No Drawings

AROMATIC POLYCARBONATE RESIN, PROCESS FOR PRODUCING THE SAME, OPTICAL-PART MOLDING MATERIAL, AND OPTICAL PART

CROSS REFERENCE TO RELATED APPLICATIONS

This application is a Continuation of Ser. No. 10/501,882 filed Aug. 24, 2004 now U.S. Pat. No. 7,112,644.

TECHNICAL FIELD

The present invention comprises the first invention, the second invention and the third invention, and the first invention and the second invention relate to an aromatic polycarbonate resin and a production process for the same, more specifically to an aromatic polycarbonate resin which is excellent in a transparency, a heat resistance and a mechanical strength and which has a good moldability and an effective production process for the same. The third invention relates to an optical part-molding material and an optical part, more specifically to an optical part-molding material suited to a molding material for an optical disc substrate such as a digital audio disc, a digital video disc and an optical memory disc, various lenses such as a lens for an optical pickup, spectacle lenses, contact lenses and a lens sheet, an optical sheet substrate such as a prism, a mirror, an optical fiber, a liquid crystal display and a portable key sheet and an optical functional element such as a light guiding substance, a reflection film, a light scattering sheet, a polarizing plate and a phase difference plate and an optical part prepared by molding the same.

BACKGROUND ART

Referring to the first invention and the second invention, an aromatic polycarbonate resin is excellent in properties such as a transparency, a heat resistance and a mechanical strength, and therefore it is widely used as a so-called engineering plastic in various industrial fields. In general, an aromatic polycarbonate resin produced by reacting 2,2-bis(4-hydroxyphenyl)propane (common name: bisphenol A) with a carbonic ester-forming compound such as phosgene and diphenyl carbonate is used as the above aromatic polycarbonate resin. Because of a good balance of a transparency and a mechanical strength with a moldability, an aromatic polycarbonate resin produced using this bisphenol A as a raw material is used as a raw material for electric and electronic equipments and optical equipments in many cases. In recent years, these equipments are increasingly demanded to be decreased in a size and a weight, and an aromatic polycarbonate resin which is further improved in characteristics such as a heat resistance and a mechanical strength without reducing basic characteristics endowed to this aromatic polycarbonate resin is requested to be developed in order to meet the above demand.

Then, in order to meet the above demand, it has been tried to obtain an aromatic polycarbonate resin which is improved further more in a heat resistance and a mechanical strength by using compounds having various structures as a divalent phenol which is a raw material for an aromatic polycarbonate resin. For example, an aromatic polycarbonate resin using a raw material of a bisphenol derivative of adamantane as divalent phenol is proposed in Soobsch. Akad. Nauk Gruz. SSR (1977), 88(3), p. 597 to 600. This aromatic polycarbonate resin in which an adamantane skeleton is introduced into a structural unit of an aromatic polycarbonate polymer chain has a high heat resistance but has the difficulties that it has a poor solubility in solvents because it is liable to be crystallized and it is inferior in a moldability and that the molded article is reduced in a transparency. Further, proposed are aromatic polycarbonate resins using a raw material of 1,1-bis(4-hydroxyphenyl)cyclohexane and 9,9'-bis(4-hydroxyphenyl)fluorene alone or in combination with bisphenol A as divalent phenol. However, these aromatic polycarbonate resins comprising a structural unit having a residue of divalent phenol has a higher heat resistance than that of an aromatic polycarbonate resin using bisphenol A as a raw material, but further higher heat resistance is required in the production steps of electric and electronic equipment parts. Thus, when used as a raw material for electric and electronic equipments and optical equipment parts, an aromatic polycarbonate resin which has further higher transparency, heat resistance and mechanical strength and which is excellent in a moldability is required to be developed.

An object of the first invention and the second invention is to provide an aromatic polycarbonate resin which is excellent in a transparency, a heat resistance and a mechanical strength and which has a good moldability and a production process for the same.

Referring to the third invention, various plastics are proposed as an optical part-molding material. Characteristics such as a heat resistance, an impact resistance, a mechanical strength and an optical property are required to the above optical part-molding material, and engineering plastics such as polymethyl methacrylate, polycarbonate using 2,2-bis(4-hydroxyphenyl)propane as a raw material, polyacrylate and polyethersulfone have so far been used as materials satisfying the above requirements.

On the other hand, some of a large number of these optical parts have a high transparency and require a very high heat resistance. For example, a liquid crystal display substrate of an active matrix mode in which a thin film transistor is arranged as a switching element for every picture element on a glass substrate in a matrix form and actuated is adopted in many cases. In a production step of the above liquid crystal display, an electrical insulating layer of silicon nitride has to be formed by a glow discharge deposition method when forming a thin film transistor on a substrate. Accordingly, since the substrate of the above liquid crystal display is glass, it is liable to be broken by impact exerted from the outside such as falling, and therefore it is desired to use a substrate of an engineering plastic having an excellent impact resistance. In the above engineering plastics, however, a heat resistance and an impact resistance are not satisfactory in, for example, polymethyl methacrylate, and a heat resistance in forming an electrical insulating layer is not necessarily satisfactory in polycarbonate and polyacrylate. Further, polyethersulfone has the difficulties that it has a high heat resistance but is colored amber and that optical anisotropy is liable to be brought about by slight molecular orientation.

Thus, an optical part-molding material which is excellent in a heat resistance and a mechanical strength in addition to an optical characteristic is requested to be developed as a molding material for optical parts.

An object of the third invention is to provide an optical part-molding material which is excellent in an optical characteristic and a mechanical strength and which has a particularly high heat resistance and an optical part prepared by molding the same.

DISCLOSURE OF THE INVENTION

I. First Invention

Intensive researches repeated by the present inventors in order to solve the problems described above have resulted in finding that the object described above can be achieved by an aromatic polycarbonate resin obtained by reacting specific divalent phenols having an adamantane skeleton and divalent phenols having various chemical structures with a carbonic ester-forming compound, and they have come to complete the present first invention based on the above knowledge.

That is, the essential point of the first invention is described below.

(1) An aromatic polycarbonate resin which comprises a repetitive unit (I-1) represented by the following Formula [I-1]:

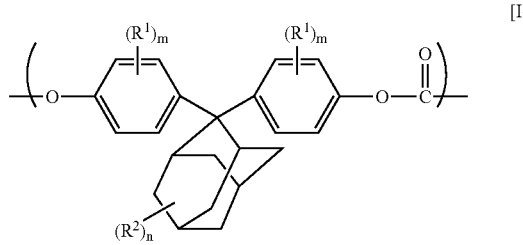

(wherein $R^1$ represents a group selected from the group of a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms and a fluoroalkyl group having 1 to 6 carbon atoms; $R^2$ represents a group selected from the group of a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms and a fluoroalkyl group having 1 to 12 carbon atoms; m represents an integer of 0 to 4; and n represents an integer of 0 to 14) and a repetitive unit (I-2) represented by the following Formula [I-2]:

(wherein $R^3$ represents a group selected from the group of a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms and a fluoroalkyl group having 1 to 12 carbon atoms; X represents a single bond, —O—, —CO—, —S—, —SO—, —SO$_2$—, —C($R^4R^5$)— (provided that $R^4$ and $R^5$ each represent independently a hydrogen atom, an alkyl group having 1 to 6 carbon atoms, a phenyl group or a trifluoromethyl group), a substituted or non-substituted cycloalkylidene group having 6 to 12 carbon atoms, a 9,9'-fluorenylidene group, a 1,8-menthanediyl group, a 2,8-menthanediyl group, a substituted or non-substituted pyrazylidene group, a substituted or non-substituted arylene group having 6 to 12 carbon atoms or —C(CH$_3$)$_2$-ph-C(CH$_3$)$_2$— (provided that ph represents a phenylene group); and p represents an integer of 0 to 4) and in which the solution having a concentration of 0.5 g/deciliter using methylene chloride as a solvent has a reduced viscosity ($\eta_{sp}$/c) of 0.1 deciliter/g or more which is measured at 20° C.

(2) The aromatic polycarbonate resin as described in the above item (1), wherein the repetitive unit (I-2) is represented by the following Formula [I-3]:

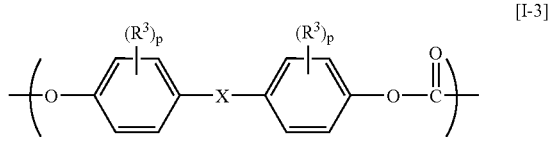

wherein $R^3$, X and p each represent the same as $R^3$, X and p in Formula [I-2].

(3) The aromatic polycarbonate resin as described in the above item (1) or (2), wherein $R^1$ in Formula [I-1] is an alkyl group having 1 to 6 carbon atoms.

(4) The aromatic polycarbonate resin as described in any of the above items (1) to (3), wherein X in Formula [I-2] is —C($R^4R^5$)— (provided that $R^4$ and $R^5$ each represent independently a hydrogen atom, an alkyl group having 1 to 6 carbon atoms, a phenyl group or a trifluoromethyl group), a substituted or non-substituted cycloalkylidene group having 6 to 12 carbon atoms or a 9,9'-fluorenylidene group.

(5) A production process for the aromatic polycarbonate resin as described in the above item (1), characterized by reacting a 2,2-bis(4-hydroxyphenyl)adamantane compound represented by the following Formula [I-4]:

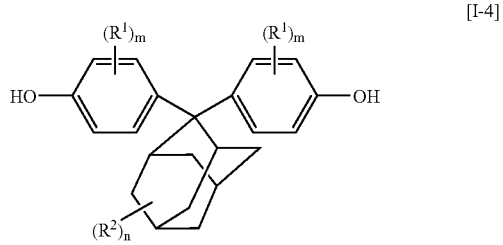

(wherein $R^1$ represents a group selected from the group of a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms and a fluoroalkyl group having 1 to 6 carbon atoms; $R^2$ represents a group selected from the group of a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms and a fluoroalkyl group having 1 to 12 carbon atoms; m represents an integer of 0 to 4; and n represents an integer of 0 to 14) and divalent phenol represented by the following Formula [I-5]:

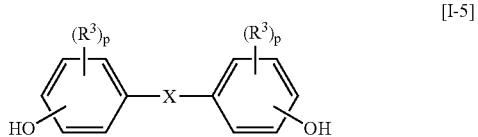

(wherein R³ represents a group selected from the group of a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms and a fluoroalkyl group having 1 to 12 carbon atoms; X represents a single bond, —O—, —CO—, —S—, —SO—, —SO₂—, —C(R⁴R⁵)— (provided that R⁴ and R⁵ each represent independently a hydrogen atom, an alkyl group having 1 to 6 carbon atoms, a phenyl group or a trifluoromethyl group), a substituted or non-substituted cycloalkylidene group having 6 to 12 carbon atoms, a 9,9'-fluorenylidene group, a 1,8-menthanediyl group, a 2,8-menthanediyl group, a substituted or non-substituted pyrazylidene group, a substituted or non-substituted arylene group having 6 to 12 carbon atoms or —C(CH₃)₂-ph-C(CH₃)₂— (provided that ph represents a phenylene group); and p represents an integer of 0 to 4) with a carbonic ester-forming compound.

(6) The production process for the aromatic polycarbonate resin as described in the above item (5), wherein a compound represented by the following Formula [I-6] is used as the divalent phenol:

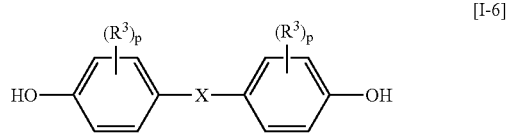

wherein R³, X and p each represent the same as R³, X and p in Formula [I-5].

(7) The production process for the aromatic polycarbonate resin as described in the above item (5) or (6), wherein the compound in which R¹ in Formula [I-4] is an alkyl group having 1 to 6 carbon atoms is used as the 2,2-bis(4-hydroxyphenyl)adamantane compound.

(8) The production process for the aromatic polycarbonate resin as described in any of the above items (5) to (7), wherein used as the divalent phenol is the compound in which X in Formula [I-5] is —C(R⁴R⁵)— (provided that R⁴ and R⁵ each represent independently a hydrogen atom, an alkyl group having 1 to 6 carbon atoms, a phenyl group or a trifluoromethyl group), a substituted or non-substituted cycloalkylidene group having 6 to 12 carbon atoms or a 9,9'-fluorenylidene group.

II. Second Invention

Intensive researches repeated by the present inventors in order to solve the problems described above have resulted in finding that the object described above can be achieved by an aromatic polycarbonate resin obtained by reacting specific divalent phenols having an adamantane skeleton and constituted by a phenol group having a substituent with a carbonic ester-forming compound, and they have come to complete the present second invention based on the above knowledge.

That is, the essential point of the second invention is described below.

(1) An aromatic polycarbonate resin which comprises a repetitive unit represented by the following Formula [II-1]:

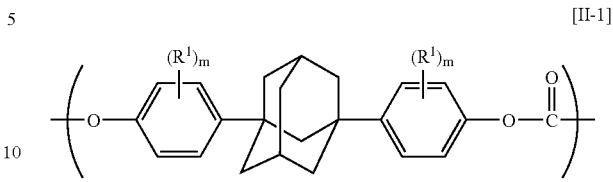

(wherein R¹ represents a group selected from the group of a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms and a fluoroalkyl group having 1 to 6 carbon atoms; and m represents an integer of 1 to 4) and in which the solution having a concentration of 0.5 g/deciliter using methylene chloride as a solvent has a reduced viscosity ($\eta_{sp}/c$) of 0.1 deciliter/g or more which is measured at 20° C.

(2) The aromatic polycarbonate resin as described in the above item (1), wherein R¹ in Formula [II-1] is an alkyl group having 1 to 6 carbon atoms.

(3) An aromatic polycarbonate resin which comprises a repetitive unit (II-1) represented by the following Formula [II-2]:

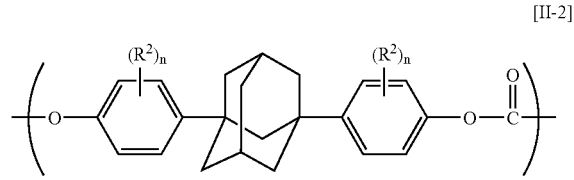

(wherein R² represents a group selected from the group of a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms and a fluoroalkyl group having 1 to 6 carbon atoms; and n is an integer of 1 to 4) and a repetitive unit (II-2) represented by the following Formula [II-3]:

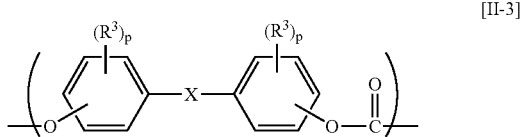

(wherein R³ represents a group selected from the group of a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms and a fluoroalkyl group having 1 to 12 carbon atoms; X represents a single bond, —O—, —CO—, —S—, —SO—, —SO₂—, —C(R⁴R⁵)— (provided that R⁴ and R⁵ each represent independently a hydrogen atom, an alkyl group having 1 to 6 carbon atoms, a phenyl group or a trifluoromethyl group), a substituted or non-substituted cycloalkylidene group having 6 to 12 carbon atoms, a 9,9'-fluorenylidene group, a 1,8-menthanediyl group, a 2,8-menthanediyl group, a substituted or non-substituted pyrazylidene group, a substituted or non-substituted arylene group having 6 to 12 carbon atoms or —C(CH$_3$)$_2$-ph-C(CH$_3$)$_2$— (provided that ph represents a phenylene group); and p represents an integer of 0 to 4) and in which the solution having a concentration of 0.5 g/deciliter using methylene chloride as a solvent has a reduced viscosity ($\eta_{sp}$/c) of 0.1 deciliter/g or more which is measured at 20° C.

(4) The aromatic polycarbonate resin as described in the above item (3), wherein the repetitive unit (II-2) is represented by the following Formula [II-4]:

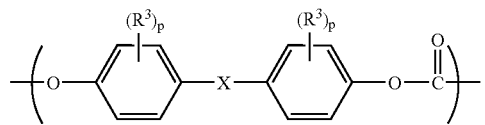

wherein R$^3$, X and p each represent the same as R$^3$, X and p in Formula [II-3].

(5) The aromatic polycarbonate resin as described in the above item (3) or (4), wherein R$^2$ in Formula [II-2] is an alkyl group having 1 to 6 carbon atoms.

(6) The aromatic polycarbonate resin as described in any of the above items (3) to (5), wherein X in Formula [II-3] is —C(R$^4$R$^5$)— (provided that R$^4$ and R$^5$ each represent independently a hydrogen atom, an alkyl group having 1 to 6 carbon atoms, a phenyl group or a trifluoromethyl group), a substituted or non-substituted cycloalkylidene group having 6 to 12 carbon atoms or a 9,9'-fluorenylidene group.

(7) A production process for the aromatic polycarbonate resin as described in the above item (1), characterized by reacting a 1,3-bis(4-hydroxyphenyl)adamantane compound represented by the following Formula [II-5]:

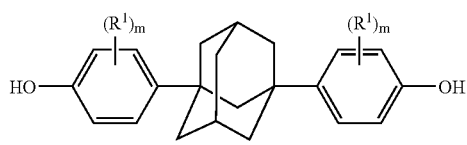

(wherein R$^1$ represents a group selected from the group of a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms and a fluoroalkyl group having 1 to 6 carbon atoms; and m represents an integer of 1 to 4) with a carbonic ester-forming compound.

(8) The production process for the aromatic polycarbonate resin as described in the above item (7), wherein the compound in which R$^1$ in Formula [II-5] is an alkyl group having 1 to 6 carbon atoms is used as the 1,3-bis(4-hydroxyphenyl)adamantane compound.

(9) A production process for the aromatic polycarbonate resin as described in the above item (3), characterized by reacting a 1,3-bis(4-hydroxyphenyl)adamantane compound represented by the following Formula [II-6]:

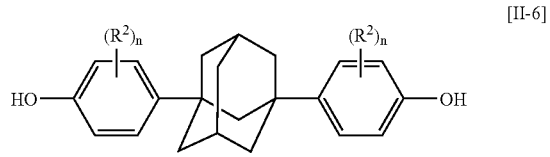

(wherein R$^2$ represents a group selected from the group of a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms and a fluoroalkyl group having 1 to 6 carbon atoms; and n represents an integer of 1 to 4) and divalent phenol represented by the following Formula [II-7]:

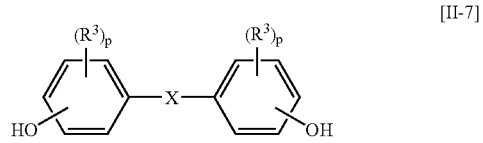

(wherein R$^3$ represents a group selected from the group of a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms and a fluoroalkyl group having 1 to 12 carbon atoms; X represents a single bond, —O—, —CO—, —S—, —SO—, —SO$_2$—, —C(R$^4$R$^5$)— (provided that R$^4$ and R$^5$ each represent independently a hydrogen atom, an alkyl group having 1 to 6 carbon atoms, a phenyl group or a trifluoromethyl group), a substituted or non-substituted cycloalkylidene group having 6 to 12 carbon atoms, a 9,9'-fluorenylidene group, a 1,8-menthanediyl group, a 2,8-menthanediyl group, a substituted or non-substituted pyrazylidene group, a substituted or non-substituted arylene group having 6 to 12 carbon atoms or —C(CH$_3$)$_2$-ph-C(CH$_3$)$_2$— (provided that ph represents a phenylene group); and p represents an integer of 0 to 4) with a carbonic ester-forming compound.

(10) The production process for the aromatic polycarbonate resin as described in the above item (9), wherein the compound in which R$^2$ in Formula [II-6] is an alkyl group having 1 to 6 carbon atoms is used as the 1,3-bis(4-hydroxyphenyl)adamantane compound.

(11) The production process for the aromatic polycarbonate resin as described in the above item (9) or (10), wherein a compound represented by the following Formula [II-8] is used as the divalent phenol:

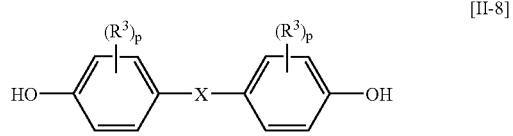

wherein R$^3$, X and p each represent the same as R$^3$, X and p in Formula [II-7].

(12) The production process for the aromatic polycarbonate resin as described in any of the above items (9) to (11), wherein used as the divalent phenol is the compound in which X in Formula [II-7] is —C($R^4R^5$)— (provided that $R^4$ and $R^5$ each represent independently a hydrogen atom, an alkyl group having 1 to 6 carbon atoms, a phenyl group or a trifluoromethyl group), a substituted or non-substituted cycloalkylidene group having 6 to 12 carbon atoms or a 9,9'-fluorenylidene group.

III. Third Invention

Intensive researches repeated by the present inventors in order to solve the problems described above have resulted in finding that the object described above can be achieved by using an aromatic polycarbonate resin comprising a repetitive unit having a specific adamantane skeleton containing a 2,2-adamantyl group as an optical part-molding material, and they have come to complete the present third invention based on the above knowledge.

That is, the essential point of the third invention is described below.

(1) An optical part-molding material comprising an aromatic polycarbonate resin which comprises a repetitive unit represented by the following Formula [III-1]:

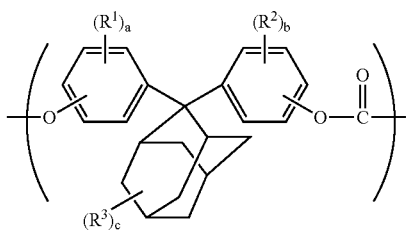

[III-1]

(wherein $R^1$ and $R^2$ each represent independently a group selected from the group of a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms and a fluoroalkyl group having 1 to 6 carbon atoms; $R^3$ represents a group selected from the group of a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms and a fluoroalkyl group having 1 to 12 carbon atoms; a and b represent an integer of 0 to 4; and c represents an integer of 0 to 14) and in which the solution having a concentration of 0.5 g/deciliter using methylene chloride as a solvent has a reduced viscosity ($\eta_{sp}/c$) of 0.1 deciliter/g or more which is measured at 20° C.

(2) The optical part-molding material as described in the above item (1), wherein $R^1$ and $R^2$ in Formula [III-1] are alkyl groups having 1 to 6 carbon atoms.

(3) The optical part-molding material comprising the aromatic polycarbonate resin as described in the above item (1) or (2), wherein the repetitive unit is represented by the following Formula [III-2]:

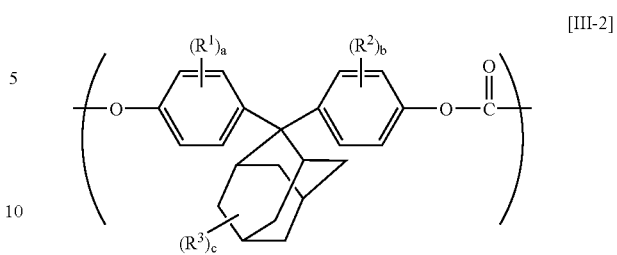

[III-2]

wherein $R^1$, $R^2$, $R^3$, a, b and c each represent the same as $R^1$, $R^2$, $R^3$, a, b and c in Formula [III-1].

(4) The optical part-molding material as described in the above item (3), wherein $R^1$ and $R^2$ in Formula [III-2] are alkyl groups having 1 to 6 carbon atoms.

(5) An optical part-molding material comprising an aromatic polycarbonate resin which comprises a repetitive unit (III-1) represented by the following Formula [III-3]:

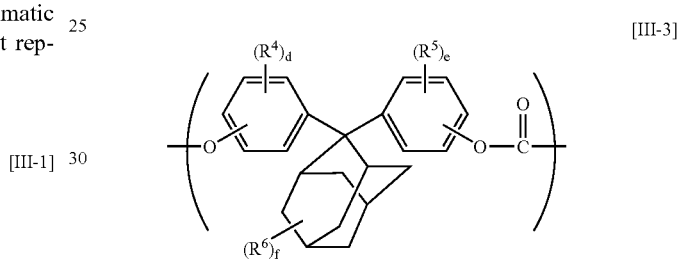

[III-3]

(wherein $R^4$ and $R^5$ each represent independently a group selected from the group of a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms and a fluoroalkyl group having 1 to 6 carbon atoms; $R^6$ represents a group selected from the group of a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms and a fluoroalkyl group having 1 to 12 carbon atoms; d and e represent an integer of 0 to 4; and f represents an integer of 0 to 14) and a repetitive unit (III-2) represented by the following Formula [III-4]:

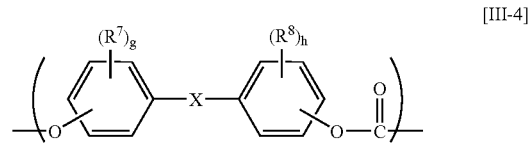

[III-4]

[wherein $R^7$ and $R^8$ each represent independently a group selected from the group of a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms and a fluoroalkyl group having 1 to 12 carbon atoms; X represents a single bond, —O—, —CO—, —S—, —SO—, —$SO_2$—, —C($R^9R^{10}$)— (provided that $R^9$ and $R^{10}$ each represent independently a hydrogen atom, an alkyl group having 1 to 6 carbon atoms, a phenyl group or a trifluoromethyl group), a substituted or non-substituted cycloalkylidene group having 6 to 12 carbon atoms, a 9,9'-fluorenylidene group, a 1,8-menthanediyl group, a 2,8-menthanediyl group, a substituted or non-substituted pyrazylidene group, a substituted or non-substituted arylene group having 6 to 12 carbon atoms, —C(CH$_3$)$_2$-ph-C(CH$_3$)$_2$— (provided that ph represents a phenylene group) or the following Formula [III-5] or [III-6]:

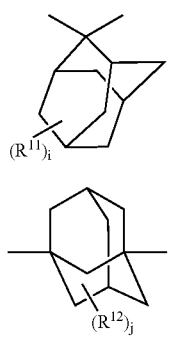

[III-5]

[III-6]

(wherein R$^{11}$ and R$^{12}$ each represent independently a group selected from the group of a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms and a fluoroalkyl group having 1 to 12 carbon atoms; and i and j each represent an integer of 0 to 14); and g and h each represent an integer of 0 to 4] and in which the solution having a concentration of 0.5 g/deciliter using methylene chloride as a solvent has a reduced viscosity ($\eta_{sp}/c$) of 0.1 deciliter/g or more which is measured at 20° C.

(6) The optical part-molding material as described in the above item (5), wherein R$^4$ and R$^5$ in Formula [III-3] are alkyl groups having 1 to 6 carbon atoms.

(7) The optical part-molding material as described in the above item (5) or (6), wherein the repetitive unit (III-2) is represented by the following Formula [III-7]:

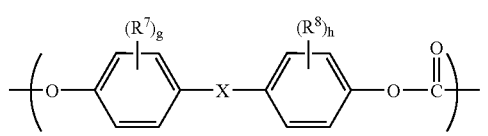

[III-7]

wherein R$^7$, R$^8$, X, g and h each represent the same as R$^7$, R$^8$, X, g and h in Formula [III-4].

(8) The optical part-molding material as described in any of the above items (5) to (7), wherein X in Formula [III-4] is —C(R$^9$R$^{10}$)— (provided that R$^9$ and R$^{10}$ each represent independently a hydrogen atom, an alkyl group having 1 to 6 carbon atoms, a phenyl group or a trifluoromethyl group), a substituted or non-substituted cycloalkylidene group having 6 to 12 carbon atoms or a 9,9'-fluorenylidene group.

(9) An optical part prepared by molding the optical part-molding material as described in any of the above items (1) to (8).

BEST MODE FOR CARRYING OUT THE INVENTION

The embodiment of the present invention shall be explained below.

I. First Invention

The first present invention (hereinafter referred to merely as the [present invention]) relates to the aromatic polycarbonate resin which comprises the repetitive unit (I-1) represented by Formula [I-1] described above and the repetitive unit (I-2) represented by Formula [I-2] described above and in which the solution having a concentration of 0.5 g/deciliter using methylene chloride as a solvent has a reduced viscosity ($\eta_{sp}/c$) of 0.1 deciliter/g or more which is measured at 20° C.

In the above aromatic polycarbonate resin, the alkyl group having 1 to 6 carbon atoms represented by R$^1$ in Formula [I-1] described above includes methyl, ethyl, n-propyl, i-propyl, n-butyl, i-butyl, sec-butyl, tert-butyl, n-pentyl, n-hexyl, cyclopentyl and cyclohexyl. The alkoxy group having 1 to 6 carbon atoms includes methoxy, ethoxy, n-propoxy, i-propoxy, i-butoxy, sec-butoxy, tert-butoxy, n-pentyloxy and n-hexyloxy. The aryl group having 6 to 12 carbon atoms includes phenyl, biphenyl, triphenyl and naphthyl, and the aryl-substituted alkenyl group having 7 to 13 carbon atoms includes benzyl, phenethyl, styryl and cinnamyl. Further, the fluoroalkyl group having 1 to 6 carbon atoms includes monofluoromethyl, difluoromethyl and trifluoromethyl.

Among the various substituents represented by R$^1$ in this Formula [I-1], the alkyl group having 1 to 6 carbon atoms is preferred because of the excellent heat resistance, and methyl is more preferred. In addition thereto, among the various substituents described above, the preferred ones include cyclohexyl, methoxy, phenyl and trifluoromethyl. In the above Formula [I-1], m may be 0, that is, it may be a hydrogen atom or may have 1 to 4 substituents. This m is more preferably 0 to 2.

The halogen atom represented by R$^2$ in Formula [I-1] described above includes a fluorine atom, a chlorine atom, a bromine atom and an iodine atom. The alkyl group having 1 to 12 carbon atoms represented by R$^2$ in the above formula includes methyl, ethyl, n-propyl, i-propyl, n-butyl, i-butyl, sec-butyl, tert-butyl, n-pentyl, n-hexyl, n-heptyl, n-octyl, n-nonyl, n-decyl, n-undecyl, n-dodecyl, cyclopentyl and cyclohexyl. The alkoxy group having 1 to 12 carbon atoms includes methoxy, ethoxy, n-propoxy, i-propoxy, i-butoxy, sec-butoxy, tert-butoxy, n-pentyloxy, n-hexyloxy, n-heptyloxy, n-octyloxy, n-nonyloxy, n-decyloxy, n-undecyloxy and n-dodecyloxy. The aryl group having 6 to 12 carbon atoms includes phenyl, biphenyl, triphenyl and naphthyl, and the aryl-substituted alkenyl group having 7 to 13 carbon atoms includes benzyl, phenethyl, styryl and cinnamyl. Further, the fluoroalkyl group having 1 to 12 carbon atoms includes monofluoromethyl, difluoromethyl and trifluoromethyl. Among the above various substituents, the preferred ones include methyl, ethyl, methoxy, ethoxy, phenyl and trifluoromethyl. Further, n in the above Formula [I-1] may be 0, that is, it may be only a hydrogen atom or may have any of 1 to 14 substituents.

In the above aromatic polycarbonate resin, the halogen atom represented by R$^3$ in Formula [I-2] described above includes a fluorine atom, a chlorine atom, a bromine atom and an iodine atom. The alkyl group having 1 to 12 carbon atoms represented by $R^3$ in the above formula includes methyl, ethyl, n-propyl, i-propyl, n-butyl, i-butyl, sec-butyl, tert-butyl, n-pentyl, n-hexyl, n-heptyl, n-octyl, n-nonyl, n-decyl, n-undecyl, n-dodecyl, cyclopentyl and cyclohexyl. The alkoxy group having 1 to 12 carbon atoms includes methoxy, ethoxy, n-propoxy, i-propoxy, i-butoxy, sec-butoxy, tert-butoxy, n-pentyloxy, n-hexyloxy, n-heptyloxy, n-octyloxy, n-nonyloxy, n-decyloxy, n-undecyloxy and n-dodecyloxy. The aryl group having 6 to 12 carbon atoms includes phenyl, biphenyl, triphenyl and naphthyl, and the aryl-substituted alkenyl group having 7 to 13 carbon atoms includes benzyl, phenethyl, styryl and cinnamyl. Further, the fluoroalkyl group having 1 to 12 carbon atoms includes monofluoromethyl, difluoromethyl and trifluoromethyl. Among the above various substituents, the preferred ones include methyl, ethyl, cyclohexyl and phenyl.

In the above aromatic polycarbonate resin, the alkyl group having 1 to 6 carbon atoms represented by $R^4$ and $R^5$ in Formula [I-2] described above includes methyl, ethyl, n-propyl, i-propyl, n-butyl, i-butyl, sec-butyl, tert-butyl, n-pentyl and n-hexyl. Among them, the suited ones include methyl, ethyl and n-propyl. Further, the substituted or non-substituted cycloalkylidene group having 6 to 12 carbon atoms represented by X in Formula [I-2] includes cyclopentylidene, cyclohexylidene, cycloheptylidene and cyclooctylidene, and the substituted or non-substituted arylene group having 6 to 12 carbon atoms includes phenylene, biphenylene, 1,4-phenylenebis(1-methylethylidene) and 1,3-phenylenebis(1-methylethylidene).

Further, the aromatic polycarbonate resin in which the repetitive unit (I-2) has the structural unit represented by Formula [I-3] is preferred since it is excellent in a heat resistance and a mechanical strength. The divalent group represented by X in the above Formulas [I-2] and [I-3] is preferably —C($R^4R^5$)— (provided that $R^4$ and $R^5$ each represent independently a hydrogen atom, an alkyl group having 1 to 6 carbon atoms, a phenyl group or a trifluoromethyl group), a substituted or non-substituted cycloalkylidene group having 6 to 12 carbon atoms or a 9,9'-fluorenylidene group because of more excellent heat resistance.

A content proportion of the repetitive unit (I-1) represented by Formula [I-1] to the repetitive unit (I-2) represented by Formula [I-2] each constituting the above aromatic polycarbonate resin shall not specifically be restricted, and a content proportion [(I-1)/((I-1)+(I-2))] of the repetitive unit (I-1) to the whole repetitive units falls preferably in a range of 0.05 to 0.99 in terms of a mole ratio. This is because of the reasons that if a mole ratio of the above repetitive unit (I-1) is lower than 0.05, the molding processability is good but the degree of a rise in the heat resistance is small and that if the above mole ratio is higher than 0.99, the particularly excellent heat resistance is shown but the molding processability is reduced in a certain case because of the low solubility in a solvent. Further, the content proportion of the above repetitive unit (I-1) to the whole repetitive units falls particularly preferably in a range of 0.05 to 0.95 because it provides a good balance of the heat resistance and the mechanical strength with the molding processability.

The aromatic polycarbonate resin of the present invention comprises the repetitive units (I-1) and (I-2), and the solution having a concentration of 0.5 g/deciliter using methylene chloride as a solvent has a reduced viscosity ($\eta_{sp}/c$) of 0.1 deciliter/g or more which is measured at 20° C. If the above reduced viscosity is less than 0.1 deciliter/g, the aromatic polycarbonate resin can not sufficiently obtain a heat resistance and a mechanical strength. The resin in which the above reduced viscosity is 0.3 to 3.0 deciliter/g is particularly suited as a molding material for electric and electronic equipments and optical equipments.

Next, the aromatic polycarbonate resin of the present invention can be produced by a process in which the specific 2,2-bis(4-hydroxyphenyl)adamantane compound represented by Formula [I-4] described above and the divalent phenols represented by Formula [I-5] described above are reacted with a carbonic ester-forming compound. In this case, the aromatic polycarbonate resin can be produced by polymerization by a method in which interfacial polymerization is carried out in the presence of a polymerizing solvent, an acid acceptor, an end terminating agent and a catalyst or a method in which transesterification is carried out under reduced pressure.

In the above Formula [I-4], the halogen atom, the alkyl group, the alkoxy group, the aryl group, the aryl-substituted alkenyl group and the fluoroalkyl group each represented by $R^1$ and $R^2$ include the same ones as the atoms and the groups each represented by $R^1$ and $R^2$ in Formula [I-1] described above. Further, an alkyl group having 1 to 6 carbon atoms is more suitably used as $R^1$ and $R^2$ in this Formula [I-4].

The 2,2-bis(4-hydroxyphenyl)adamantane compound represented by the above Formula [I-4] includes, for example, 2,2-bis(4-hydroxyphenyl)adamantane, 2,2-bis(3-methyl-4-hydroxyphenyl)adamantane, 2,2-bis(3-ethyl-4-hydroxyphenyl)adamantane, 2,2-bis(3-n-propyl-4-hydroxyphenyl)adamantane, 2,2-bis(3-i-propyl-4-hydroxyphenyl)adamantane, 2,2-bis(3-n-butyl-4-hydroxyphenyl)adamantane, 2,2-bis(3-i-butyl-4-hydroxyphenyl)adamantane, 2,2-bis(3-sec-butyl-4-hydroxyphenyl)adamantane, 2,2-bis(3-tert-butyl-4-hydroxyphenyl)adamantane, 2,2-bis(3-cyclohexyl-4-hydroxyphenyl)adamantane, 2,2-bis(3-phenyl-4-hydroxyphenyl)adamantane, 2,2-bis(3-chloro-4-hydroxyphenyl)adamantane, 2,2-bis(3-bromo-4-hydroxyphenyl)adamantane, 2,2-bis(3,5-dimethyl-4-hydroxyphenyl)adamantane, 2,2-bis(3,5-diethyl-4-hydroxyphenyl)adamantane, 2,2-bis(3,5-dichloro-4-hydroxyphenyl)adamantane and 2,2-bis(3,5-dibromo-4-hydroxyphenyl)adamantane.

The specific examples of the halogen atom and the alkyl group represented by X and $R^3$ in Formula [I-5] include the same ones as the atoms and the groups represented by X and $R^3$ in Formula [I-2] described above. The divalent phenols represented by the above Formula [I-5] include 4,4'-dihydroxybiphenyls such as 4,4'-dihydroxybiphenyl, 3,3'-difluoro-4,4'-dihydroxybiphenyl, 3,3'-dichloro-4,4'-dihydroxybiphenyl, 3,3'-dimethyl-4,4'-dihydroxybiphenyl, 3,3'-diphenyl-4,4'-dihydroxybipphenyl, 3,3'-dicyclohexyl-4,4'-dihydroxybiphenyl, 2,2'-dimethyl-4,4'-dihydroxybiphenyl and 3,3',5,5'-tetramethyl-4,4'-dihydroxybiphenyl; bis(hydroxyphenyl)alkanes such as bis(4-hydroxyphenyl)methane, bis(4-hydroxyphenyl)dipenylmethane, bis(4-hydroxyphenyl)phenylmethane, bis(3-nonyl-4-hydroxyphenyl)methane, bis(3,5-dimethyl-4-hydroxyphenyl)methane, bis(3,5-dibromo-4-hydroxyphenyl)methane, bis(3-chloro-4-hydroxyphenyl)methane, bis(3-fluoro-4-hydroxyphenyl)methane, bis(2-tert-butyl-4-hydroxyphenyl)phenylmethane, bis(2-hydroxyphenyl)methane, bis(2-hydroxyphenyl-4-hydroxyphenyl)methane, bis(2-hydroxy-4-methylphenyl)methane, bis(2-hydroxy-4-methyl-6-tert-butylphenyl)methane, bis(2-hydroxy-4,6-dimethylphenyl)methane, 1,1-bis(4-hydroxyphenyl)ethane, 1,2-bis(4-hydroxyphenyl)ethane, 1,1-bis(4-hydroxyphenyl)-1-phenylethane, 1,1-bis(4-hydroxy-3-methylphenyl)-1-phenylethane, 1,1-bis(4-hydroxy- 3-phenylphenyl)-1-phenylethane, 2-(4-hydroxy-3-methylphenyl)-2-(4-hydroxyphenyl)-1-phenylethane, 1,1-bis(2-tert-butyl-4-hydroxy-3-methylphenyl)ethane, 1-phenyl-1,1-bis(3-fluoro-4-hydroxyphenyl)ethane, 1,1-bis(2-hydroxy-4-methylphenyl)ethane, 2,2-bis(4-hydroxyphenyl)propane, 1,1-bis(4-hydroxyphenyl)propane, 2,2-bis(2-methyl-4-hydroxyphenyl)propane, 2,2-bis(3-methyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-phenyl-4-hydroxyphenyl)propane, 2,2-bis(3-cyclohexyl-4-hydroxyphenyl)propane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(4-hydroxy-3,5-dimethylphenyl)propane, 1,1-bis(2-tert-butyl-4-hydroxy-5-methylphenyl)propane, 2,2-bis(4-hydroxy-3,5-dichlorophenyl)propane, 2,2-bis(4-hydroxy-3,5-difluorophenyl)propane, 2,2-bis(4-hydroxy-3,5-dibromophenyl)propane, 2,2-bis(3-bromo-4-hydroxy-5-chlorophenyl)propane, 2,2-bis(4-hydroxyphenyl)-1,1,1,3,3,3-hexafluoropropane, 2,2-bis(2-hydroxy-4-sec-butylphenyl)propane, 2,2-bis(2-hydroxy-4,6-dimethylphenyl)propane, 2,2-bis(4-hydroxyphenyl)butane, 2,2-bis(3-methyl-4-hydroxyphenyl)butane, 1,1-bis(4-hydroxyphenyl)-2-methylpropane, 1,1-bis(2-tert-butyl-4-hydroxy-5-methylphenyl)-2-methylpropane, 1,1-bis(2-butyl-4-hydroxy-5-methylphenyl)butane, 1,1-bis(2-tert-butyl-4-hydroxy-5-methylphenyl)butane, 1,1-bis(2-methyl-4-hydroxy-5-tert-pentylphenyl)butane, 2,2-bis(4-hydroxy-3,5-dichlorophenyl)butane, 2,2-bis(4-hydroxy-3,5-dibromophenyl)butane, 2,2-bis(4-hydroxyphenyl)-3-methylbutane, 1,1-bis(4-hydroxyphenyl)-3-methylbutane, 3,3-bis(4-hydroxyphenyl)pentane, 2,2-bis(4-hydroxyphenyl)hexane, 2,2-bis(4-hydroxyphenyl)heptane, 2,2-bis(2-tert-butyl-4-hydroxy-5-methylphenyl)heptane, 2,2-bis(4-hydroxyphenyl)octane, 2,2-bis(4-hydroxyphenyl)nonane, 2,2-bis(4-hydroxyphenyl)decane, 1,1-bis(4-hydroxyphenyl)cyclopentane, 1,1-bis(4-hydroxyphenyl)cyclohexane, 1,1-bis(3-methyl-4-hydroxyphenyl)cyclohexane, 1,1-bis(4-hydroxy-3,5-dimethylphenyl)cyclohexane, 1,1-bis(3-cyclohexyl-4-hydroxyphenyl)cyclohexane, 1,1-bis(3-phenyl-4-hydroxyphenyl)cyclohexane, 1,1-bis(4-hydroxyphenyl)-3,3,5-trimethylcyclohexane and 1,1-bis(3-methyl-4-hydroxyphenyl)-3,3,5-trimethylcyclohexane; bis(4-hydroxyphenyl) ethers such as bis(4-hydroxyphenyl)ether and bis(3-fluoro-4-hydroxyphenyl)ether; bis(4-hydroxyphenyl)sulfides; such as bis(4-hydroxyphenyl)sulfide and bis(3-methyl-4-hydroxyphenyl)sulfide; bis(4-hydroxyphenyl)sulfoxides such as bis(4-hydroxyphenyl)sulfoxide and bis(3-methyl-4-hydroxyphenyl)sulfoxide; bis(4-hydroxyphenyl) sulfones such as bis(4-hydroxyphenyl)sulfone, bis(3-methyl-4-hydroxyphenyl)sulfone and bis(3-phenyl-4-hydroxyphenyl)sulfone; bis(4-hydroxyphenyl) ketones such as 4,4'-dihydroxybenzophenone; bis(hydroxyphenyl)fluorenes such as 9,9-bis(4-hydroxyphenyl)fluorene, 9,9-bis(3-methyl-4-hydroxyphenyl)fluorene and 9,9-bis(3-phenyl-4-hydroxyphenyl)fluorene; dihydroxy-p-terphenyls such as 4,4"-dihydroxy-p-terphenyl; dihydroxy-p-quarterphenyls such as 4,4'''-dihydroxy-p-quarterphenyl; bis(hydroxyphenyl)pyrazines such as 2,5-bis(4-hydroxyphenyl)pyrazine, 2,5-bis(4-hydroxyphenyl)-3,6-dimethylpyrazine and 2,5-bis(4-hydroxyphenyl)-2,6-diethylpyrazine; bis(hydroxyphenyl)menthanes such as 1,8-bis(4-hydroxyphenyl)menthane, 2,8-bis(4-hydroxyphenyl)menthane, 1,8-bis(3-methyl-4-hydroxyphenyl)menthane and 1,8-bis(4-hydroxy-3,5-dimethylphenyl)menthane; and bis[2-(4-hydroxyphenyl)-2-propyl] benzenes such as 1,4-bis[2-(4-hydroxyphenyl)-2-propyl] benzene and 1,3-bis[2-(4-hydroxyphenyl)-2-propyl] benzene.

Among the above various divalent phenols, the phenols represented by Formula [I-6] are preferred, and more suitably used are the phenols in which the divalent group represented by X in the above Formulas [I-5] and [I-6] is —C($R^4R^5$)— (provided that $R^4$ and $R^5$ each represent independently a hydrogen atom, an alkyl group having 1 to 6 carbon atoms, a phenyl group or a trifluoromethyl group), a substituted or non-substituted cycloalkylidene group having 6 to 12 carbon atoms or a 9,9'-fluorenylidene group. The divalent phenols having such chemical structure include, for example, 2,2-bis(4-hydroxyphenyl)propane, 2,2-bis(4-hydroxyphenyl)butane, 1,1-bis(4-hydroxyphenyl)cyclohexane, 1,1-bis(4-hydroxyphenyl)-3,3,5-trimethylcyclohexane, 9,9-bis(4-hydroxyphenyl)fluorene and 9,9-bis(3-methyl-4-hydroxyphenyl)fluorene.

Various dihalogenated carbonyls such as phosgene, haloformates such as chloroformate and carbonic ester compounds can be used as the carbonic ester-forming compound described above. When using the gaseous carbonic ester-forming compound such as phosgene, a method for blowing it into a reaction system can suitably be employed. A use proportion of the above carbonic ester-forming compound is advisably controlled so that it corresponds to a stoichiometric ratio (equivalent) in this reaction.

Solvents used for producing conventional aromatic polycarbonate resins are used for a solvent used in the above reaction. The suited solvents include, for example, aromatic hydrocarbon base solvents such as toluene and xylene, halogenated hydrocarbons such as methylene chloride, chloroform, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane and chlorobenzene and acetophenone. The above solvents may be used alone or in combination of two or more kinds thereof. Further, two kinds of the solvents which are not miscible with each other may be used.

Further, capable of being used as the acid acceptor are metal hydroxides such as sodium hydroxide, potassium hydroxide, lithium hydroxide and cesium hydroxide, alkaline metal carbonates such as sodium carbonate and potassium carbonate, organic acids such as pyridine or mixtures thereof. In respect to a use proportion of these acid acceptors, considering a stoichiometric ratio (equivalent) in this reaction, one equivalent of the acid acceptor per mole of a hydroxyl group of the divalent phenol of the raw material or a little excess amount over it, preferably 1 to 5 equivalent is advisably used.

Further, monovalent phenols can be used as the end terminating agent. Suitably used are, for example, p-tert-butylphenol, p-phenylphenol, p-cumylphenol, p-perfluorononylphenol, p-(perfluorononylphenyl)phenol, p-tert-perfluorobutylphenol and 1-(p-hydroxybenzyl) perfluorodecane.

Tertiary amines such as triethylamine and quaternary ammonium salts are suitably used as the catalyst. Further, a method in which a small amount of an antioxidant such as sodium sulfite and hydrosulfite is added to carry out the reaction may be adopted in this reaction system.

Next, in respect to the reaction conditions in the case of interfacial polymerization, the reaction temperature is usually 0 to 150° C., preferably 5 to 40° C., and the reaction pressure may be any of reduced pressure, atmospheric pressure and applied pressure, but the reaction is carried out preferably at atmospheric pressure or under applied pressure of a self pressure level in the reaction system. The reaction time is, though depending on the reaction temperature, 0.5 minute to 10 hours, preferably one minute to about 2 hours. This reaction may be carried out by any reaction system of a continuous method, a semi-continuous method and a batch method.

When the reaction is carried out by transesterification, the reaction is carried out at 120 to 350° C. under reduced pressure. In this case, the degree of reduced pressure is strengthened in stages as the reaction goes on, and the pressure is finally reduced to 1 torr or lower to draw out resulting phenols to the outside of the reaction system. The reaction time is advisably controlled to 1 to 4 hours, and the catalyst and the antioxidant may be added if necessary.

The aromatic polycarbonate resin thus obtained can be molded and processed by the same methods as in thermoplastic resins such as an aromatic polycarbonate resin using publicly known bisphenol A as a raw material. Further, various additives used in molding and processing, for example, a heat stabilizer, an antioxidant, a light stabilizer, a colorant, an anti-static agent, a lubricant and a mold releasing agent can be blended in suited amounts. The aromatic polycarbonate resin thus obtained is excellent in a transparency, a heat resistance and a mechanical strength, and therefore it is highly useful as a molding material for electric and electronic equipments and optical equipments, for example, lenses such as a head lump lens, a prism, an optical fiber, an optical disc and a panel for display equipments.

Next, the present invention shall more specifically be explained with reference to examples and comparative examples.

EXAMPLE I-1

Methylene chloride 700 ml which was a solvent was added to a solution prepared by dissolving 45 g of 2,2-bis (4-hydroxyphenyl)adamantane and 25 g of 1,1-bis(4-hydroxyphenyl)cyclohexane in 1,360 ml of a potassium hydroxide aqueous solution having a concentration of 2 normal, and phosgene gas was blown into the above solution for 30 minutes in a proportion of 950 ml/minute under cooling while stirring. Then, this reaction liquid was left standing still and separating, and a methylene chloride solution of an oligomer having a polymerization degree of 2 to 5 and having a chloroformate group at a molecular end was obtained in the organic layer.

Methylene chloride was added to 110 ml of the methylene chloride solution thus obtained to control the whole amount to 150 ml, and then a solution prepared by dissolving 5 g of 1,1-bis(4-hydroxyphenyl)cyclohexane in 50 ml of a potassium hydroxide aqueous solution having a concentration of 2 normal was added thereto. Further, 0.2 g of p-tert-butylphenol was added thereto as a molecular weight-controlling agent. Then, 1.0 ml of a triethylamine aqueous solution having a concentration of 7% was added as a catalyst while vigorously stirring the above mixed solution to carry out reaction at 25° C. for 1.5 hour under stirring.

After finishing the reaction, the reaction product thus obtained was diluted with one liter of methylene chloride and washed twice with 1.5 liter of water. Then, it was washed with hydrochloric acid having a concentration of 0.05 normal and then further washed twice with one liter of water. The organic layer thus obtained was thrown into methanol to carry out refining by reprecipitation, whereby a powder of an aromatic polycarbonate resin was obtained.

A solution of the aromatic polycarbonate resin obtained above having a concentration of 0.5 g/liter using methylene chloride as a solvent had a reduced viscosity ($\eta_{sp}/c$) of 0.6 deciliter/g at 20° C. Further, confirmation of the structure of the above aromatic polycarbonate resin by $^1$H-NMR spectrum analysis resulted in finding that the chemical structure thereof comprised the following repetitive unit:

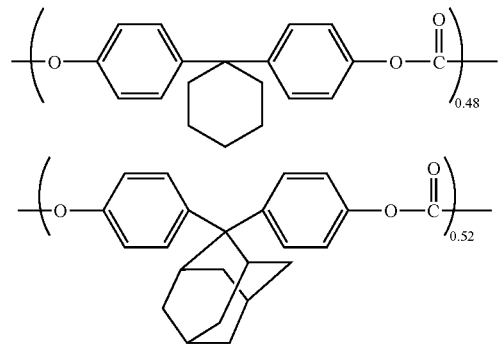

Further, a glass transition temperature of the above aromatic polycarbonate resin was measured to find that it was 238° C. and confirm that it had a very high heat resistance. Further, a methylene chloride solution of the above aromatic polycarbonate resin was used to produce a film by casting to find that it was colorless and highly transparent.

EXAMPLE I-2

Methylene chloride 700 ml which was a solvent was added to a solution prepared by dissolving 75 g of 2,2-bis (4-hydroxyphenyl)adamantane in 1,360 ml of a potassium hydroxide aqueous solution having a concentration of 2 normal, and phosgene gas was blown into the above solution for 30 minutes in a proportion of 950 ml/minute under cooling while stirring. Then, this reaction liquid was left standing still and separating, and a methylene chloride solution of an oligomer having a polymerization degree of 2 to 5 and having a chloroformate group at a molecular end was obtained in the organic layer.

Methylene chloride was added to 110 ml of the methylene chloride solution thus obtained to control the whole amount to 150 ml, and then a solution prepared by dissolving 6 g of 9,9-bis(3-methyl-4-hydroxyphenyl)fluorene in 50 ml of a potassium hydroxide aqueous solution having a concentration of 2 normal was added thereto. Further, 0.2 g of p-tert-butylphenol was added thereto as a molecular weight-controlling agent. Then, 1.4 ml of a triethylamine aqueous solution having a concentration of 7% was added as a catalyst while vigorously stirring the above mixed solution to carry out reaction at 25° C. for 1.5 hour under stirring.

After finishing the reaction, the reaction product thus obtained was diluted with 0.5 liter of methylene chloride and washed twice with 0.5 liter of water. Then, it was washed with hydrochloric acid having a concentration of 0.01 normal and then further washed twice with 0.5 liter of water. The organic layer thus obtained was thrown into methanol to carry out refining by reprecipitation, whereby a powder of an aromatic polycarbonate resin was obtained.

A solution of the aromatic polycarbonate resin obtained above having a concentration of 0.5 g/liter using methylene chloride as a solvent had a reduced viscosity ($\eta_{sp}/c$) of 0.5 deciliter/g at 20° C. Further, confirmation of the structure of the above aromatic polycarbonate resin by $^1$H-NMR spectrum analysis resulted in finding that the chemical structure thereof comprised the following repetitive unit:

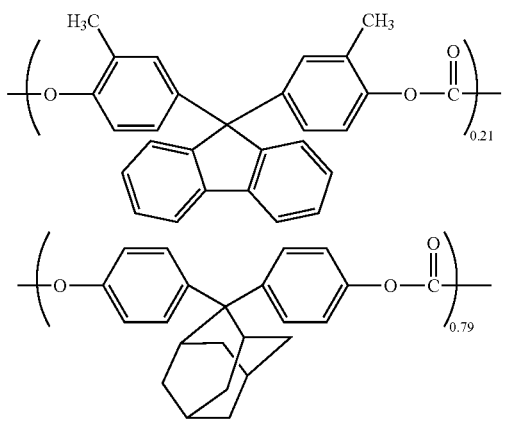

Further, a glass transition temperature of the above aromatic polycarbonate resin was measured to find that it was 282° C. and confirm that it had a very high heat resistance. Further, a methylene chloride solution of the above aromatic polycarbonate resin was used to produce a film by casting to find that it was colorless and highly transparent.

EXAMPLE I-3

Methylene chloride 900 ml which was a solvent was added to a solution prepared by dissolving 170 g of 1,1-bis(4-hydroxyphenyl)cyclohexane in 1,530 ml of a potassium hydroxide aqueous solution having a concentration of 2 normal, and phosgene gas was blown into the above solution for 30 minutes in a proportion of 950 ml/minute under cooling while stirring. Then, this reaction liquid was left standing still and separating, and a methylene chloride solution of an oligomer having a polymerization degree of 2 to 5 and having a chloroformate group at a molecular end was obtained in the organic layer.

Methylene chloride was added to 110 ml of the methylene chloride solution thus obtained to control the whole amount to 150 ml, and then a solution prepared by dissolving 6 g of 2,2-bis(3,5-dimethyl-4-hydroxyphenyl)adamantane in 50 ml of a potassium hydroxide aqueous solution having a concentration of 2 normal was added thereto. Further, 0.2 g of p-tert-butylphenol was added thereto as a molecular weight-controlling agent. Then, 1.0 ml of a triethylamine aqueous solution having a concentration of 7% was added as a catalyst while vigorously stirring the above mixed solution to carry out reaction at 25° C. for 1.5 hour under stirring.

After finishing the reaction, the reaction product thus obtained was diluted with 0.5 liter of methylene chloride and washed twice with 0.5 liter of water. Then, it was washed with hydrochloric acid having a concentration of 0.01 normal and then further washed twice with 0.5 liter of water. The organic layer thus obtained was thrown into methanol to carry out refining by reprecipitation, whereby a powder of an aromatic polycarbonate resin was obtained.

A solution of the aromatic polycarbonate resin obtained above having a concentration of 0.5 g/liter using methylene chloride as a solvent had a reduced viscosity ($\eta_{sp}/c$) of 0.4 deciliter/g at 20° C. Further, confirmation of the structure of the above aromatic polycarbonate resin by $^1$H-NMR spectrum analysis resulted in finding that the chemical structure thereof comprised the following repetitive unit:

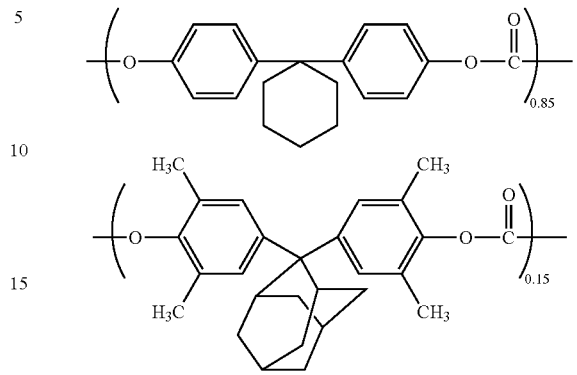

Further, a glass transition temperature of the above aromatic polycarbonate resin was measured to find that it was 207° C. and confirm that it had a very high heat resistance. Further, a methylene chloride solution of the above aromatic polycarbonate resin was used to produce a film by casting to find that it was colorless and highly transparent.

COMPARATIVE EXAMPLE I-1

The same procedure as in Example I-2 was repeated, except that in Example I-2, 5 g of 2,2-bis(4-hydroxyphenyl)adamantane was added in place of 6 g of 9,9-bis(3-methyl-4-hydroxyphenyl)fluorene added at the latter stage.

A solution of the aromatic polycarbonate resin obtained above having a concentration of 0.5 g/liter using methylene chloride as a solvent had a reduced viscosity ($\eta_{sp}/c$) of 0.5 deciliter/g at 20° C. Further, confirmation of the structure of the above aromatic polycarbonate resin by $^1$H-NMR spectrum analysis resulted in finding that the chemical structure thereof comprised the following repetitive unit:

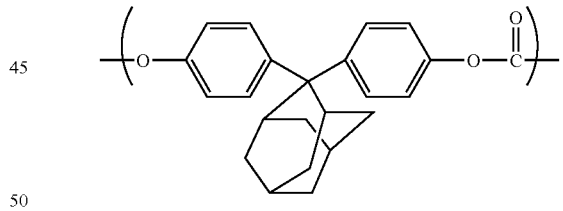

Further, a glass transition temperature of the above aromatic polycarbonate resin was measured to find that it was 298° C. and confirm that it had a very high heat resistance. However, a film produced by casting using a methylene chloride solution of the above aromatic polycarbonate resin was whitened due to crystallization and, so that it had a low transparency.

II. Second Invention

The aromatic polycarbonate resin of the present invention is an aromatic polycarbonate resin which comprises the repetitive unit represented by Formula [II-1] described above and in which the solution having a concentration of 0.5 g/deciliter using methylene chloride as a solvent has a reduced viscosity ($\eta_{sp}/c$) of 0.1 deciliter/g or more which is measured at 20° C.

In the above aromatic polycarbonate resin, the halogen atom represented by $R^1$ in Formula [II-1] described above includes a fluorine atom, a chlorine atom, a bromine atom and an iodine atom. The alkyl group having 1 to 6 carbon atoms represented by $R^1$ in the above formula includes methyl, ethyl, n-propyl, i-propyl, n-butyl, i-butyl, sec-butyl, tert-butyl, n-pentyl, n-hexyl, cyclopentyl and cyclohexyl. The alkoxy group having 1 to 6 carbon atoms includes methoxy, ethoxy, n-propoxy, i-propoxy, i-butoxy, sec-butoxy, tert-butoxy, n-pentyloxy and n-hexyloxy. The aryl group having 6 to 12 carbon atoms includes phenyl, biphenyl, triphenyl and naphthyl, and the aryl-substituted alkenyl group having 7 to 13 carbon atoms includes benzyl, phenethyl, styryl and cinnamyl. Further, the fluoroalkyl group having 1 to 6 carbon atoms includes monofluoromethyl, difluoromethyl and trifluoromethyl. Further, the resin in which m in Formula [II-1] described above is 1 to 4 can be used, and the resin in which m 1 to 2 is more preferred. When m is 2 or more, respective $R^1$ may be the same of different.

The aromatic polycarbonate resin of the resin present invention in which $R^1$ in Formula [II-1] described above is an alkyl group having 1 to 6 carbon atoms is particularly preferred since it is excellent in a heat resistance.

Also, the aromatic polycarbonate resin of a copolymer type according to the present invention is an aromatic polycarbonate resin which comprises the repetitive unit (II-1) represented by Formula [II-2] described above and the repetitive unit (II-2) represented by Formula [II-3] described above and in which the solution having a concentration of 0.5 g/deciliter using methylene chloride as a solvent has a reduced viscosity ($\eta_{sp}/c$) of 0.1 deciliter/g or more which is measured at 20° C.

In the above aromatic polycarbonate resin, the halogen atom, the alkyl group, the alkoxy group, the aryl group, the aryl-substituted alkenyl group and the fluoroalkyl group each represented by $R^2$ in Formula [II-2] include the same ones as those each represented by $R^1$ in Formula [I-1] described above. Also, the resin in which n in Formula [II-2] described above is 1 to 4 is used, and the resin in which n 1 to 2 is more preferred. Further, the aromatic polycarbonate resin comprising the repetitive unit (II-1) in which $R^2$ in Formula [II-2] described above is an alkyl group having 1 to 6 carbon atoms is preferred since it is excellent in a heat resistance.

Also, the halogen atom represented by $R^3$ in Formula [II-3] includes a fluorine atom, a chlorine atom, a bromine atom and an iodine atom. The alkyl group having 1 to 12 carbon atoms includes methyl, ethyl, n-propyl, i-propyl, n-butyl, i-butyl, sec-butyl, tert-butyl, n-pentyl, n-hexyl, n-heptyl, n-octyl, n-nonyl, n-decyl, n-undecyl, n-dodecyl, cyclopentyl and cyclohexyl. The alkoxy group having 1 to 12 carbon atoms includes methoxy, ethoxy, n-propoxy, i-propoxy, i-butoxy, sec-butoxy, tert-butoxy, n-pentyloxy, n-hexyloxy, n-heptyloxy, n-octyloxy, n-nonyloxy, n-decyloxy, n-undecyloxy and n-dodecyloxy. The aryl group having 6 to 12 carbon atoms includes phenyl, biphenyl, triphenyl and naphthyl, and the aryl-substituted alkenyl group having 7 to 13 carbon atoms includes benzyl, phenethyl, styryl and cinnamyl. Further, the fluoroalkyl group having 1 to 12 carbon atoms includes monofluoromethyl, difluoromethyl and trifluoromethyl. Among the above various substituents, the preferred ones include methyl, ethyl, methoxy, ethoxy, phenyl and trifluoromethyl. Further, p in Formula [II-3] may be 0, that is, it may be only a hydrogen atom or may have any of 1 to 4 substituents.

Given are the resins in which X in the above Formula [II-3] is a single bond, —O—, —CO—, —S—, —SO—, —SO$_2$—, —C($R^4R^5$)— (provided that $R^4$ and $R^5$ each represent independently a hydrogen atom, an alkyl group having 1 to 6 carbon atoms, a phenyl group or a trifluoromethyl group), a substituted or non-substituted cycloalkylidene group having 6 to 12 carbon atoms, a 9,9'-fluorenylidene group, a 1,8-menthanediyl group, a 2,8-menthanediyl group, a substituted or non-substituted pyrazylidene group, a substituted or non-substituted arylene group having 6 to 12 carbon atoms or —C(CH$_3$)$_2$-ph-C(CH$_3$)$_2$— (provided that ph represents a phenylene group). Among them, the resins in which X is —C($R^4R^5$)— (provided that $R^4$ and $R^5$ each represent independently a hydrogen atom, an alkyl group having 1 to 6 carbon atoms, a phenyl group or a trifluoromethyl group), a substituted or non-substituted cycloalkylidene group having 6 to 12 carbon atoms or a 9,9'-fluorenylidene group are preferred since they are excellent in a heat resistance.

In this regard, the alkyl group having 1 to 6 carbon atoms represented by $R^4$ and $R^5$ described above in —C($R^4R^5$)— represented by X includes the same ones as the alkyl groups having 1 to 6 carbon atoms represented by $R^1$ described above. Also, the substituted or non-substituted cycloalkylidene group having 6 to 12 carbon atoms represented by X includes cyclopentylidene, cyclohexylidene, 3,3,5-trimethylcyclohexylidene, cycloheptylidene and cyclooctylidene, and the substituted or non-substituted arylene group having 6 to 12 carbon atoms includes phenylene, biphenylene, 1,4-phenylenebis(1-methylethylidene) and 1,3-phenylenebis(1-methylethylidene).

Further, the above repetitive unit (II-2) constituting the aromatic polycarbonate resin has preferably a structure containing a p-phenylene group represented by Formula [II-4] since the resin is excellent in a heat resistance and a mechanical strength.

Next, a content proportion of the repetitive unit (II-1) to the repetitive unit (II-2) each constituting the above aromatic polycarbonate resin of a copolymer type shall not specifically be restricted, and a content proportion [(II-1)/((II-1)+(II-2))] of the repetitive unit (II-1) to the whole repetitive units falls preferably in a range of 0.05 to 0.99 in terms of a mole ratio. This is because of the reasons that if a mole ratio of the above repetitive unit (II-1) is lower than 0.05, the moldability is good but the degree of a rise in the heat resistance is small and that if the above mole ratio is higher than 0.99, the excellent heat resistance is shown but the solubility in a solvent is low and the moldability is reduced. Further, the above content proportion of the repetitive unit (II-1) to the whole repetitive units falls preferably in a range of 0.05 to 0.95 because it provides a good balance of the heat resistance and the mechanical strength with the molding processability.

In the aromatic polycarbonate resin of the present invention, the solution having a concentration of 0.5 g/deciliter using methylene chloride as a solvent has a reduced viscosity ($\eta_{sp}/c$) of 0.1 deciliter/g or more which is measured at 20° C. This is because if the above reduced viscosity is less than 0.1 deciliter/g, the aromatic polycarbonate resin can not sufficiently obtain a heat resistance and a mechanical strength. The resin in which the above reduced viscosity is 0.3 to 3.0 deciliter/g is particularly suited as a molding material for electric and electronic equipments and optical equipments.

Next, the aromatic polycarbonate resin of the present invention can be produced by a process in which the 1,3-bis(4-hydroxyphenyl)adamantane compound represented by Formula [II-5] described above is reacted with a carbonic ester-forming compound. Further, the aromatic polycarbonate resin of a copolymer type can be produced by a process in which the 1,3-bis(4-hydroxyphenyl)adamantane compound represented by Formula [II-6] described above and the divalent phenols represented by Formula [II-7] described above are reacted with a carbonic ester-forming compound. In carrying out these reactions, the aromatic polycarbonate resin can be produced by a method in which interfacial polymerization is carried out in the presence of a polymerizing solvent, an acid acceptor, an end terminating agent and a catalyst or a method in which transesterification is carried out under reduced pressure.

In Formulas [II-5] and [II-6], the halogen atom, the alkyl group, the alkoxy group, the aryl group, the aryl-substituted alkenyl group and the fluoroalkyl group each represented by $R^1$ to $R^6$ include the same ones as the atoms and the groups each represented by $R^1$ in Formula [II-1] described above. In this regard, the 1,3-bis(4-hydroxyphenyl)adamantane compound represented by the above Formulas [II-5] and [II-6] includes, for example, 1,3-bis(3-chloro-4-hydroxyphenyl) adamantane, 1,3-bis(3-bromo-4-hydroxyphenyl)adamantane, 1,3-bis(3-fluoro-4-hydroxyphenyl)adamantane, 1,3-bis (3-methyl-4-hydroxyphenyl)adamantane, 1,3-bis(3-ethyl-4-hydroxyphenyl)adamantane, 1,3-bis(3-n-propyl-4-hydroxyphenyl)adamantane, 1,3-bis(3-i-propyl-4-hydroxyphenyl)adamantane, 1,3-bis(3-n-butyl-4-hydroxyphenyl)adamantane, 1,3-bis(3-i-butyl-4-hydroxyphenyl)adamantane, 1,3-bis(3-sec-butyl-4-hydroxyphenyl)adamantane, 1,3-bis(3-tert-butyl-4-hydroxyphenyl)adamantane, 1,3-bis(3-n-pentyl-4-hydroxyphenyl)adamantane, 1,3-bis(3-n-hexyl-4-hydroxyphenyl)adamantane, 1,3-bis(3-cyclohexyl-4-hydroxyphenyl)adamantane, 1,3-bis(3-methoxy-4-hydroxyphenyl)adamantane, 1,3-bis(3-ethoxy-4-hydroxyphenyl)adamantane, 1,3-bis(3-phenyl-4-hydroxyphenyl)adamantane, 1,3-bis(3-benzyl-4-hydroxyphenyl)adamantane, 1,3-bis(3-naphthyl-4-hydroxyphenyl)adamantane, 1,3-bis(3-tetrafluormethyl-4-hydroxyphenyl)adamantane, 1,3-bis(3,5-dichloro-4-hydroxyphenyl)adamantane, 1,3-bis(3,5-dibromo-4-hydroxyphenyl)adamantane, 1,3-bis(3,5-difluoro-4-hydroxyphenyl)adamantane, 1,3-bis(3,5-dimethyl-4-hydroxyphenyl)adamantane, 1,3-bis(3,5-diethyl-4-hydroxyphenyl)adamantane, 1 1,3-bis(3,5-dimethoxy-4-hydroxyphenyl)adamantane and 1, 3-bis (3, 5-diethoxy-4-hydroxyphenyl)adamantane.

The halogen atom, the alkyl group, the alkoxy group, the aryl group, the aryl-substituted alkenyl group and the fluoroalkyl group each represented by X and $R^3$ in Formula [II-7] described above include the same ones as the atoms and the groups each represented by X and $R^3$ in Formula [II-3] described above. The compounds given as the examples of the divalent phenols represented by Formula [I-5] in the first invention apply to the above divalent phenols represented by Formula [II-7].

The phenol represented by Formula [II-8] described above is suitably used as the divalent phenol used for producing the aromatic polycarbonate resin of the present invention. Further, the divalent phenol in which X in Formulas [II-7] and [II-8] described above is —C($R^4R^5$)— (provided that $R^4$ and $R^5$ each represent independently a hydrogen atom, an alkyl group having 1 to 6 carbon atoms, a phenyl group or a trifluoromethyl group), a substituted or non-substituted cycloalkylidene group having 6 to 12 carbon atoms or a 9,9'-fluorenylidene group is preferably used since the aromatic polycarbonate resin which is excellent in a heat resistance and a mechanical strength is obtained. The suitable divalent phenols having such chemical structure include, for example, 2,2-bis(4-hydroxyphenyl)propane, 2,2-bis(4-hydroxyphenyl)butane, 1,1-bis(4-hydroxyphenyl) cyclohexane, 1,1-bis(4-hydroxyphenyl)-3,3,5-trimethylcyclohexane, 9,9-bis(4-hydroxyphenyl)fluorene and 9,9-bis(3-methyl-4-hydroxyphenyl)fluorene.

Also, the compounds given in the first invention apply to the carbonic ester-forming compound described above. When using the gaseous carbonic ester-forming compound such as phosgene, a method for blowing it into a reaction system can suitably be adopted.

Solvents used for producing conventional aromatic polycarbonate resins are used for a solvent used in the above reaction, and the solvents given in the first invention apply thereto. The above solvents may be used alone or in combination of two or more kinds thereof. Further, two kinds of the solvents which are not miscible with each other may be used.

Also, those described in the first invention apply as they are to the acid acceptor, the end terminating agent and the catalyst.

Further, those described in the first invention also apply as they are to the reaction conditions in the case of interfacial polymerization or the reaction conditions in the case of transesterification.

Those described in the first invention also apply as they are to molding and processing of the aromatic polycarbonate resin thus obtained and various additives used therein.

The aromatic polycarbonate resin thus obtained is excellent in a transparency, a heat resistance and a mechanical strength, and therefore it is highly useful as a molding material for electric and electronic equipments and optical equipments, for example, lenses such as a head lump lens, a prism, an optical fiber, an optical disc and a panel for display equipments.

Next, the present invention shall more specifically be explained with reference to examples and comparative examples.

EXAMPLE II-1

Methylene chloride 900 ml which was a solvent was added to a solution prepared by dissolving 170 g of 1,1-bis (4-hydroxyphenyl)cyclohexane in 1,530 ml of a potassium hydroxide aqueous solution having a concentration of 2 normal, and phosgene gas was blown into the above solution for 30 minutes in a proportion of 950 ml/minute under cooling while stirring. Then, this reaction liquid was left standing still and separating, and a methylene chloride solution of an oligomer having a polymerization degree of 2 to 5 and having a chloroformate group at a molecular end was obtained in the organic layer.

Methylene chloride was added to 110 ml of the methylene chloride solution thus obtained to control the whole amount to 150 ml, and then a solution prepared by dissolving 5.5 g of 1,3-bis(4-hydroxyphenyl)adamantane in 50 ml of a potassium hydroxide aqueous solution having a concentration of 2 normal was added thereto. Further, 0.2 g of p-tert-butylphenol was added thereto as a molecular weight-controlling agent. Then, 1.0 ml of a triethylamine aqueous solution having a concentration of 7% was added as a catalyst while vigorously stirring the above mixed solution to carry out reaction at 25° C. for 1.5 hour under stirring.

After finishing the reaction, the reaction product thus obtained was diluted with 0.5 liter of methylene chloride and washed twice with 0.5 liter of water. Then, it was washed with 0.5 liter of hydrochloric acid having a concentration of 0.01 normal and then further washed twice with 0.5 liter of water. The organic layer thus obtained was thrown into methanol to carry out refining by reprecipitation, whereby an aromatic polycarbonate resin was obtained.

A solution of the aromatic polycarbonate resin obtained above having a concentration of 0.5 g/deciliter using methylene chloride as a solvent had a reduced viscosity ($\eta_{sp}/c$) of 0.4 deciliter/g at 20° C. Further, confirmation of the structure of the above aromatic polycarbonate resin by $^1$H-NMR spectrum analysis resulted in finding that the chemical structure thereof comprised the following repetitive unit:

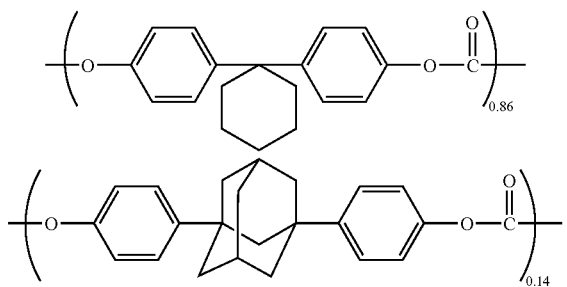

Further, a glass transition temperature of the above aromatic polycarbonate resin was measured to find that it was 189° C. and confirm that it had a very high heat resistance. Further, a methylene chloride solution of the above aromatic polycarbonate resin was used to produce a film by casting to find that it was colorless and highly transparent.

EXAMPLE II-2

The same procedure as in Example II-1 was repeated, except that 6 g of 1,3-bis(3,5-dimethyl-4-hydroxyphenyl)adamantane was added in place of 1,3-bis(4-hydroxyphenyl)adamantane which was the raw material used in Example II-1.

A solution of the aromatic polycarbonate resin obtained above having a concentration of 0.5 g/deciliter using methylene chloride as a solvent had a reduced viscosity ($\eta_{sp}/c$) of 0.5 deciliter/g at 20° C. Further, confirmation of the structure of the above aromatic polycarbonate resin by $^1$H-NMR spectrum analysis resulted in finding that the chemical structure thereof comprised the following repetitive unit:

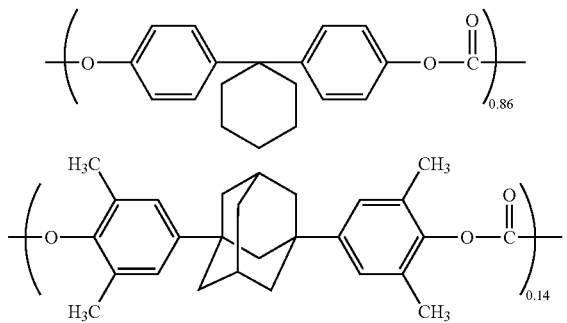

Further, a glass transition temperature of the above aromatic polycarbonate resin was measured to find that it was 196° C. and confirm that it had a very high heat resistance. Further, a methylene chloride solution of the above aromatic polycarbonate resin was used to produce a film by casting to find that it was colorless and highly transparent.

EXAMPLE II-3

Methylene chloride 900 ml which was a solvent was added to a solution prepared by dissolving 170 g of 2,2-bis(4-hydroxyphenyl)propane in 1,530 ml of a potassium hydroxide aqueous solution having a concentration of 2 normal, and phosgene gas was blown into the above solution for 30 minutes in a proportion of 950 ml/minute under cooling while stirring. Then, this reaction liquid was left standing still and separating, and a methylene chloride solution of an oligomer having a polymerization degree of 2 to 5 and having a chloroformate group at a molecular end was obtained in the organic layer.

Methylene chloride was added to 110 ml of the methylene chloride solution thus obtained to control the whole amount to 150 ml, and then a solution prepared by dissolving 5.5 g of 1,3-bis(3,5-dimethyl-4-hydroxyphenyl)adamantane in 50 ml of a potassium hydroxide aqueous solution having a concentration of 2 normal was added thereto. Further, 0.2 g of p-tert-butylphenol was added thereto as a molecular weight-controlling agent. Then, 1.0 ml of a triethylamine aqueous solution having a concentration of 7% was added as a catalyst while vigorously stirring the above mixed solution to carry out reaction at 25° C. for 1.5 hour under stirring.

After finishing the reaction, the reaction product thus obtained was diluted with 0.5 liter of methylene chloride and washed twice with 0.5 liter of water. Then, it was washed with 0.5 liter of hydrochloric acid having a concentration of 0.01 normal and then further washed twice with 0.5 liter of water. The organic layer thus obtained was thrown into methanol to carry out refining by reprecipitation, whereby an aromatic polycarbonate resin was obtained.

A solution of the aromatic polycarbonate resin obtained above having a concentration of 0.5 g/deciliter using methylene chloride as a solvent had a reduced viscosity ($\eta_{sp}/c$) of 0.4 deciliter/g at 20° C. Further, confirmation of the structure of the above aromatic polycarbonate resin by $^1$H-NMR spectrum analysis resulted in finding that the chemical structure thereof comprised the following repetitive unit:

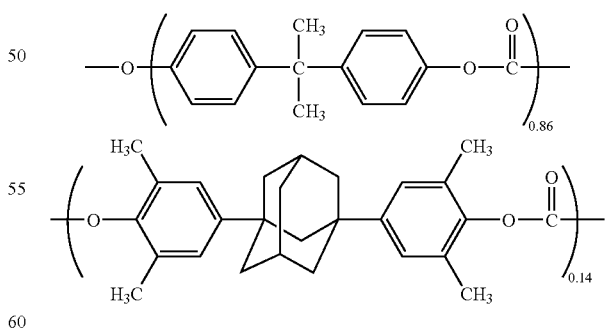

Further, a glass transition temperature of the above aromatic polycarbonate resin was measured to find that it was 170° C. and confirm that it had a high heat resistance. Further, a methylene chloride solution of the above aromatic polycarbonate resin was used to produce a film by casting to find that it was colorless and highly transparent.

COMPARATIVE EXAMPLE II-1

Only 1,1-bis(4-hydroxyphenyl)cyclohexane was used as the divalent phenol of the raw material to produce an aromatic polycarbonate resin by conventional interfacial polymerization.

A solution of the aromatic polycarbonate resin obtained above having a concentration of 0.5 g/deciliter using methylene chloride as a solvent had a reduced viscosity ($\eta_{sp}/c$) of 0.4 deciliter/g at 20° C. It was confirmed that the chemical structure of the above aromatic polycarbonate resin comprised the following repetitive unit:

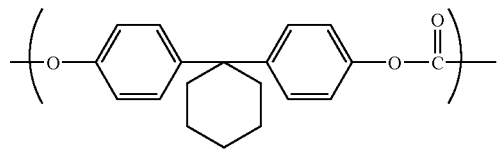

Further, a glass transition temperature of the above aromatic polycarbonate resin was measured to find that it was 170° C.

III. Third Invention

The optical part-molding material of the present invention comprises the aromatic polycarbonate resin which comprises the repetitive unit represented by Formula [III-1] or Formula [III-2] described above and in which the solution having a concentration of 0.5 g/deciliter using methylene chloride as a solvent has a reduced viscosity ($\eta_{sp}/c$) of 0.1 deciliter/g or more which is measured at 20° C. or the aromatic polycarbonate resin which comprises the repetitive unit (III-1) represented by Formula [III-3] described above and the repetitive unit (III-2) represented by Formula [III-4] or Formula [III-7] described above and in which the solution having a concentration of 0.5 g/deciliter using methylene chloride as a solvent has a reduced viscosity ($\eta_{sp}/c$) of 0.1 deciliter/g or more which is measured at 20° C.

In the repetitive unit represented by Formula [III-1] or Formula [III-2] which is the structural unit for the above aromatic polycarbonate resin, the halogen atom represented by $R^1$ and $R^2$ includes a fluorine atom, a chlorine atom, a bromine atom and an iodine atom. The alkyl group having 1 to 6 carbon atoms represented by $R^1$ and $R^2$ includes methyl, ethyl, n-propyl, i-propyl, n-butyl, i-butyl, sec-butyl, tert-butyl, n-pentyl, n-hexyl, cyclopentyl and cyclohexyl. The alkoxy group having 1 to 6 carbon atoms includes methoxy, ethoxy, n-propoxy, i-propoxy, n-butoxy, i-butoxy, sec-butoxy, tert-butoxy, n-pentyloxy and n-hexyloxy. The aryl group having 6 to 12 carbon atoms includes phenyl, biphenyl and naphthyl, and the aryl-substituted alkenyl group having 7 to 13 carbon atoms includes benzyl, phenethyl, styryl and cinnamyl. Further, the fluoroalkyl group having 1 to 12 carbon atoms includes monofluoromethyl, difluoromethyl and trifluoromethyl. Further, a and b may be 0, that is, it may be only a hydrogen atom or may have 1 to 4, preferably 1 to 2 substituents.

Further, the aromatic polycarbonate resin in which $R^1$ and $R^2$ in Formula [III-1] or Formula [III-2] are the alkyl groups having 1 to 6 carbon atoms is preferred as a molding material for optical parts since it is excellent in an heat resistance. Among the above alkyl groups having 1 to 6 carbon atoms, methyl is more preferred.

In Formula [III-1] described above, the halogen atom represented by $R^3$ includes the same ones as in $R^1$ and $R^2$ described above. The alkyl group having 1 to 12 carbon atoms represented by $R^3$ includes methyl, ethyl, n-propyl, i-propyl, n-butyl, i-butyl, sec-butyl, tert-butyl, n-pentyl, n-hexyl, n-heptyl, n-octyl, n-nonyl, n-decyl, n-undecyl, n-dodecyl, cyclopentyl and cyclohexyl. The alkoxy group having 1 to 12 carbon atoms includes methoxy, ethoxy, n-propoxy, i-propoxy, n-butoxy, i-butoxy, sec-butoxy, tertbutoxy, n-pentyloxy, n-hexyloxy, n-heptyloxy, n-octyloxy, n-nonyloxy, n-decyloxy, n-undecyloxy and n-dodecyloxy. The aryl group having 6 to 12 carbon atoms includes phenyl, biphenyl and naphthyl, and the aryl-substituted alkenyl group having 7 to 13 carbon atoms includes benzyl, phenethyl, styryl and cinnamyl. Further, the fluoroalkyl group having 1 to 12 carbon atoms includes monofluoromethyl, difluoromethyl and trifluoromethyl. Among the above various substituents, methyl, ethyl, methoxy, ethoxy, phenyl and trifluoromethyl are particularly preferred. Further, c may be 0, that is, it may be only a hydrogen atom or may have 1 to 14 substituents.

In Formula [III-3], the halogen atom, the alkyl group, the alkoxy group, the aryl group, the aryl-substituted alkenyl group and the fluoroalkyl group each represented by $R^4$, $R^5$ and $R^6$ include the same ones as the atoms and the groups each represented by $R^1$, $R^2$ and $R^3$ described above.

In Formula [III-4], the halogen atom, the alkyl group, the alkoxy group, the aryl group, the aryl-substituted alkenyl group and the fluoroalkyl group each represented by $R^7$ and $R^8$ include the same ones as the atoms and the groups each represented by $R^3$ described above. X in the above Formula [III-4] includes a single bond, —O—, —CO—, —S—, —SO—, —SO$_2$—, —C($R^9R^{10}$)— (provided that $R^9$ and $R^{10}$ each represent independently a hydrogen atom, an alkyl group having 1 to 6 carbon atoms, a phenyl group or a trifluoromethyl group), a substituted or non-substituted cycloalkylidene group having 6 to 12 carbon atoms, a 9,9'-fluorenylidene group, a 1,8-menthanediyl group, a 2,8-menthanediyl group, a substituted or non-substituted pyrazylidene group, a substituted or non-substituted arylene group having 6 to 12 carbon atoms, —C(CH$_3$)$_2$-ph-C(CH$_3$)$_2$— (provided that ph represents a phenylene group) or a substituted or non-substituted adamantyl group represented by Formula [III-5] or Formula [III-6]. The halogen atom, the alkyl group, the alkoxy group, the aryl group, the aryl-substituted alkenyl group and the fluoroalkyl group each represented by $R^{11}$ and $R^{12}$ in the above Formula [III-5] and Formula [III-6] include the same ones as the atoms and the groups each represented by $R^3$ described above. Further, i and j may be 0 or it may have 1 to 14 substituents.

In this regard, the alkyl group having 1 to 6 carbon atoms represented by $R^9$ and $R^{10}$ described above includes the ones as in $R^1$ and $R^2$ described above. Further, the substituted or non-substituted cycloalkylidene group having 6 to 12 carbon atoms represented by X includes cyclopentylidene, cyclohexylidene and cyclooctylidene, and the substituted or non-substituted arylene group having 6 to 12 carbon atoms includes phenylene, biphenylene, naphthylene, 1,4-phenylenebis(1-methylethylidene) and 1,3-phenylenebis(1-methylethylidene). In the above Formula [III-4], g and h may be 0 or it may have 1 to 4 substituents.

Further, the resin in which X in the above Formulas [III-4] is —C($R^9R^{10}$)— (provided that $R^9$ and $R^{10}$ each represent independently a hydrogen atom, an alkyl group having 1 to 6 carbon atoms, a phenyl group or a trifluoromethyl group), a substituted or non-substituted cycloalkylidene group having 6 to 12 carbon atoms or a 9,9'-fluorenylidene group is preferred since it is excellent in an optical property, a heat resistance and a mechanical strength.

The aromatic polycarbonate resin in which the repetitive unit (III-2) has the structural unit represented by Formula [III-7] is preferred since it is excellent in a heat resistance and a mechanical strength.

A content proportion of the repetitive unit (III-1) to the repetitive unit (III-2) each constituting the above aromatic polycarbonate resin shall not specifically be restricted, and a content proportion [(III-1)/((III-1)+(III-2))] of the repetitive unit (III-1) to the whole repetitive units falls preferably in a range of 0.05 to 0.99 in terms of a mole ratio. This is because of the reasons that if a mole ratio of the above repetitive unit (III-1) is lower than 0.05, the molding processability is good but the degree of a rise in the heat resistance is small in a certain case and that if the above mole ratio is higher than 0.99, the particularly excellent heat resistance is shown but the molding processability is reduced in a certain case. In the case of the above aromatic polycarbonate resin of a copolymer type, the content proportion of the above repetitive unit (III-1) to the whole repetitive units falls particularly preferably in a range of 0.05 to 0.95 because it provides a good balance of the heat resistance and the mechanical strength with the moldability.

The aromatic polycarbonate resin used for the optical part-molding material of the present invention is a resin in which the solution having a concentration of 0.5 g/deciliter using methylene chloride as a solvent has a reduced viscosity ($\eta_{sp}/c$) of 0.1 deciliter/g or more which is measured at 20° C. This is because of the reasons that if the above reduced viscosity is less than 0.1 deciliter/g, the aromatic polycarbonate resin can not sufficiently obtain a heat resistance and a mechanical strength and that characteristics required to the molding material for optical parts can not sufficiently be satisfied. The aromatic polycarbonate resin in which a reduced viscosity is 0.3 to 3.0 deciliter/g is particularly suited as the molding material for optical equipment parts.

Next, the aromatic polycarbonate resin used in the present invention can be produced by a process in which a 2,2-bis(hydroxyphenyl)adamantane compound alone or the same and the divalent phenols are reacted with a carbonic ester-forming compound. In this case, it can be produced by a method in which interfacial polymerization is carried out in the presence of a polymerizing solvent, an acid acceptor, an end terminating agent and a catalyst or a method in which transesterification is carried out under reduced pressure.

The adamantane compound used for producing the above aromatic polycarbonate resin includes, for example, 2,2-bis(4-hydroxyphenyl)adamantane, 2,2-bis(3-hydroxyphenyl)adamantane, 2,2-bis(3-chloro-4-hydroxyphenyl)adamantane, 2,2-bis(3-bromo-4-hydroxyphenyl)adamantane, 2,2-bis(3-fluoro-4-hydroxyphenyl)adamantane, 2,2-bis(3-methyl-4-hydroxyphenyl)adamantane, 2,2-bis(3-ethyl-4-hydroxyphenyl)adamantane, 2,2-bis(3-n-propyl-4-hydroxyphenyl)adamantane, 2,2-bis(3-i-propyl-4-hydroxyphenyl)adamantane, 2,2-bis(3-n-butyl-4-hydroxyphenyl)adamantane, 2,2-bis(3-i-butyl-4-hydroxyphenyl)adamantane, 2,2-bis(3-sec-butyl-4-hydroxyphenyl)adamantane, 2,2-bis(3-tert-butyl-4-hydroxyphenyl)adamantane, 2,2-bis(3-n-pentyl-4-hydroxyphenyl)adamantane, 2,2-bis(3-n-hexyl-4-hydroxyphenyl)adamantane, 2,2-bis(3-cyclohexyl-4-hydroxyphenyl)adamantane, 2,2-bis(3-methoxy-4-hydroxyphenyl)adamantane, 2,2-bis(3-ethoxy-4-hydroxyphenyl)adamantane, 2,2-bis(3-phenyl-4-hydroxyphenyl)adamantane, 2,2-bis(3-benzyl-4-hydroxyphenyl)adamantane, 2,2-bis(3-naphthyl-4-hydroxyphenyl)adamantane, 2,2-bis(3-tetrafluormethyl-4-hydroxyphenyl)adamantane, 2,2-bis(3,5-dichloro-4-hydroxyphenyl)adamantane, 2,2-bis(3,5-dibromo-4-hydroxyphenyl)adamantane, 2,2-bis(3,5-difluoro-4-hydroxyphenyl)adamantane, 2,2-bis(3,5-dimethyl-4-hydroxyphenyl)adamantane, 2,2-bis(3,5-diethyl-4-hydroxyphenyl)adamantane, 2,2-bis(3,5-dimethoxy-4-hydroxyphenyl)adamantane and 2,2-bis(3,5-diethoxy-4-hydroxyphenyl)adamantane. The above 2,2-bis(hydroxyphenyl)adamantane compounds may be used in combination of two or more kinds thereof.

The divalent phenol used for producing the above aromatic polycarbonate resin includes 4,4'-dihydroxybiphenyls; bis(hydroxyphenyl)alkanes; bis(4-hydroxyphenyl) ethers; bis(4-hydroxyphenyl)sulfides; bis(4-hydroxyphenyl)sulfoxides; bis(4-hydroxyphenyl)sulfones; bis(4-hydroxyphenyl) ketones; bis(hydroxyphenyl)fluorenes; dihydroxy-p-terphenyls; dihydroxy-p-quarterphenyls; bis(hydroxyphenyl)pyrazines; bis(hydroxyphenyl)menthanes; and bis[2-(4-hydroxyphenyl)-2-propyl]benzenes, all of which have been given as the examples in the first invention. Further, it includes 1,3-bis(4-hydroxyphenyl)adamantane, 1,3-bis(3-chloro-4-hydroxyphenyl)adamantane and 1,3-bis(3-methyl-4-hydroxyphenyl)adamantane.

Also, the compounds given in the first invention apply to the carbonic ester-forming compound described above. When using the gaseous carbonic ester-forming compound such as phosgene, a method for blowing it into a reaction system can suitably be adopted.

Solvents used for producing conventional aromatic polycarbonate resins are used for a solvent used in the above reaction, and the solvents given in the first invention apply thereto. The above solvents may be used alone or in combination of two or more kinds thereof. Further, two kinds of the solvents which are not miscible with each other may be used.

Also, those described in the first invention apply as they are to the acid acceptor, the end terminating agent and the catalyst.

Further, those described in the first invention also apply as they are to the reaction conditions in the case of interfacial polymerization or the reaction conditions in the case of transesterification.

Those described in the first invention also apply as they are to molding and processing of the optical part-molding material comprising the aromatic polycarbonate resin thus obtained and various additives used therein.

The optical part-molding material of the present invention has an excellent transparency and is excellent in a heat resistance, a mechanical strength and a dimensional stability, and therefore it is highly useful as a molding material for an optical disc substrate such as a digital audio disc, a digital video disc and an optical memory disc, various lenses such as a lens for an optical pickup, spectacle lenses, contact lenses and a lens sheet, an optical sheet substrate such as a prism, a mirror, an optical fiber, a liquid crystal display and a portable key sheet and an optical functional element such as a light guiding substance, a reflection film, a light scattering sheet, a polarizing plate and a phase difference plate.

Next, the present invention shall more specifically be explained with reference to examples and comparative examples.

EXAMPLE III-1

(1) Production of an Optical Part-molding Material

Methylene chloride 700 ml which was a solvent was added to a solution prepared by dissolving 45 g of 2,2-bis(4-hydroxyphenyl)adamantane and 25 g of 1,1-bis(4-hydroxyphenyl)cyclohexane in 1,360 ml of a potassium hydroxide aqueous solution having a concentration of 2 normal, and phosgene gas was blown into the above solution for 30 minutes in a proportion of 950 ml/minute under cooling while stirring. Then, this reaction liquid was left standing still and separating, and a methylene chloride solution of an oligomer having a polymerization degree of 2 to 5 and having a chloroformate group at a molecular end was obtained in the organic layer.

Methylene chloride was added to 110 ml of the methylene chloride solution thus obtained to control the whole amount to 150 ml, and then a solution prepared by dissolving 5 g of 1,1-bis(4-hydroxyphenyl)cyclohexane in 50 ml of a potassium hydroxide aqueous solution having a concentration of 2 normal was added thereto. Further, 0.2 g of p-tert-butylphenol was added thereto as a molecular weight-controlling agent. Then, 1.0 ml of a triethylamine aqueous solution having a concentration of 7% was added as a catalyst while vigorously stirring the above mixed solution to carry out reaction at 25° C. for 1.5 hour under stirring.

After finishing the reaction, the reaction product thus obtained was diluted with one liter of methylene chloride and washed twice with 1.5 liter of water. Then, it was washed with hydrochloric acid having a concentration of 0.05 normal and then further washed twice with one liter of water. The organic layer thus obtained was thrown into methanol to carry out refining by reprecipitation, whereby a powder of an aromatic polycarbonate resin was obtained.

A solution of the aromatic polycarbonate resin obtained above having a concentration of 0.5 g/liter using methylene chloride as a solvent had a reduced viscosity ($\eta_{sp}/c$) of 0.6 deciliter/g at 20° C. Further, confirmation of the structure of the above aromatic polycarbonate resin by $^1$H-NMR spectrum analysis resulted in finding that the chemical structure thereof comprised the following repetitive unit:

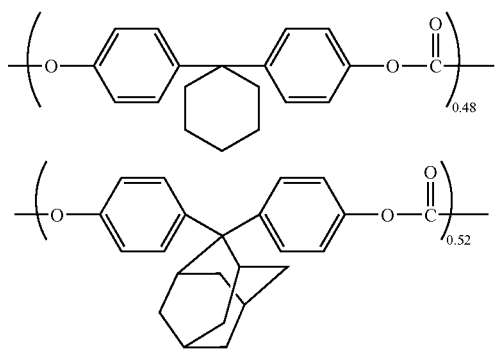

(2) Evaluation of the Optical Part-molding Material

A solution having a concentration of 20 mass % which was prepared by dissolving the aromatic polycarbonate resin obtained in (1) described above in methylene chloride was cast on a glass substrate and left standing for a half day or longer, and then a film formed on the glass substrate was peeled off from the glass substrate. Then, this film was heated in a vacuum dryer at 70° C. for 2 hours and then at 100° C. for 12 hours, whereby the transparent film having a thickness of 0.1 mm was obtained.

(2-1) Heat Resistance

The aromatic polycarbonate resin film obtained above was heated from 25° C. up to 350° C. at a heating speed of 10° C./minute under nitrogen flow (20 ml/minute) by means of DSC220 manufactured by Seiko Electron Co., Ltd. and immediately quenched to remove a heat history of the sample, and a glass transition temperature thereof was further measured at the same heating speed according to JIS K7121. As a result thereof, it was found that the above aromatic polycarbonate resin had a glass transition temperature of 238° C.

(2-2) Transparency

A test piece having a length of 40 mm and a width of 40 mm was cut out from the aromatic polycarbonate resin film obtained above, and this test piece was measured for a haze (%) by means of HGM-2DP type haze meter manufactured by Suga Test Instruments Co., Ltd. As a result thereof, it was found that the above aromatic polycarbonate resin film had a haze of 0.3%.

(2-3) Retardation

A test piece having a length of 40 mm and a width of 40 mm was cut out from the aromatic polycarbonate resin film obtained above, and this test piece was measured for a phase difference at a wavelength of 15 nm by means of a polarizing microspectrophotometer by a rotary polarizer method (Semonalmon method). As a result thereof, it was found that the above aromatic polycarbonate resin film had a retardation of 4 nm.

(2-4) Refractive Index

A test piece having a length of 20 mm and a width of 10 mm was cut out from the aromatic polycarbonate resin film obtained above, and this test piece was measured for a refractive index by means of an Abbe's refractometer manufactured by Atago Co., Ltd. As a result thereof, it was found that the above aromatic polycarbonate resin film had a refractive index of 1.584.

EXAMPLE III-2

(1) Production of an Optical Part-molding Material

Methylene chloride 700 ml which was a solvent was added to a solution prepared by dissolving 75 g of 2,2-bis(4-hydroxyphenyl)adamantane in 1,360 ml of a potassium hydroxide aqueous solution having a concentration of 2 normal, and phosgene gas was blown into the above solution for 30 minutes in a proportion of 950 ml/minute under cooling while stirring. Then, this reaction liquid was left standing still and separating, and a methylene chloride solution of an oligomer having a polymerization degree of 2 to 5 and having a chloroformate group at a molecular end was obtained in the organic layer.

Methylene chloride was added to 110 ml of the methylene chloride solution thus obtained to control the whole amount to 150 ml, and then a solution prepared by dissolving 6 g of 9,9-bis(3-methyl-4-hydroxyphenyl)fluorene in 50 ml of a potassium hydroxide aqueous solution having a concentration of 2 normal was added thereto. Further, 0.2 g of p-tert-butylphenol was added thereto as a molecular weight-controlling agent. Then, 1.4 ml of a triethylamine aqueous solution having a concentration of 7% was added as a catalyst while vigorously stirring the above mixed solution to carry out reaction at 25° C. for 1.5 hour under stirring.

After finishing the reaction, the reaction product thus obtained was diluted with 0.5 liter of methylene chloride and washed twice with 0.5 liter of water. Then, it was washed with hydrochloric acid having a concentration of 0.01 normal and then further washed twice with 0.5 liter of water. The organic layer thus obtained was thrown into methanol to carry out refining by reprecipitation, whereby a powder of an aromatic polycarbonate resin was obtained.

A solution of the aromatic polycarbonate resin obtained above having a concentration of 0.5 g/liter using methylene chloride as a solvent had a reduced viscosity ($\eta_{sp}/c$) of 0.5 deciliter/g at 20° C. Further, confirmation of the structure of the above aromatic polycarbonate resin by $^1$H-NMR spectrum analysis resulted in finding that the chemical structure thereof comprised the following repetitive unit:

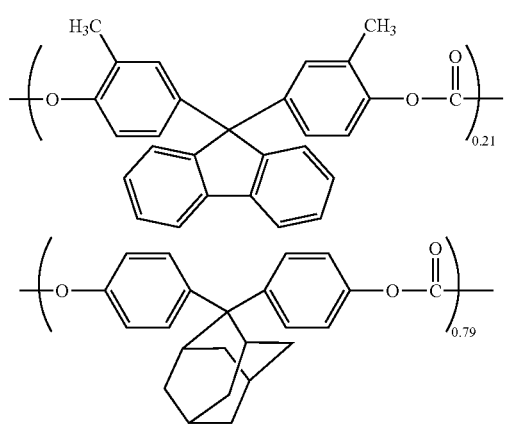

(2) Evaluation of the Optical Part-Molding Material

The aromatic polycarbonate resin obtained in (1) described above was subjected to the evaluation of an aromatic polycarbonate resin film in the same manner as in (2) of Example III-1. The results thereof are shown in Table III-1.

EXAMPLE III-3

Methylene chloride 900 ml which was a solvent was added to a solution prepared by dissolving 170 g of 1,1-bis(4-hydroxyphenyl)cyclohexane in 1,530 ml of a potassium hydroxide aqueous solution having a concentration of 2 normal, and phosgene gas was blown into the above solution for 30 minutes in a proportion of 950 ml/minute under cooling while stirring. Then, this reaction liquid was left standing still and separating, and a methylene chloride solution of an oligomer having a polymerization degree of 2 to 5 and having a chloroformate group at a molecular end was obtained in the organic layer.

Methylene chloride was added to 110 ml of the methylene chloride solution thus obtained to control the whole amount to 150 ml, and then a solution prepared by dissolving 6 g of 2,2-bis(3,5-dimethyl-4-hydroxyphenyl)adamantane in 50 ml of a potassium hydroxide aqueous solution having a concentration of 2 normal was added thereto. Further, 0.2 g of p-tert-butylphenol was added thereto as a molecular weight-controlling agent. Then, 1.0 ml of a triethylamine aqueous solution having a concentration of 7% was added as a catalyst while vigorously stirring the above mixed solution to carry out reaction at 25° C. for 1.5 hour under stirring.

After finishing the reaction, the reaction product thus obtained was diluted with 0.5 liter of methylene chloride and washed twice with 0.5 liter of water. Then, it was washed with hydrochloric acid having a concentration of 0.01 normal and then further washed twice with 0.5 liter of water. The organic layer thus obtained was thrown into methanol to carry out refining by reprecipitation, whereby a powder of an aromatic polycarbonate resin was obtained.

A solution of the aromatic polycarbonate resin obtained above having a concentration of 0.5 g/liter using methylene chloride as a solvent had a reduced viscosity ($\eta_{sp}/c$) of 0.4 deciliter/g at 20° C. Further, confirmation of the structure of the above aromatic polycarbonate resin by $^1$H-NMR spectrum analysis resulted in finding that the chemical structure thereof comprised the following repetitive unit:

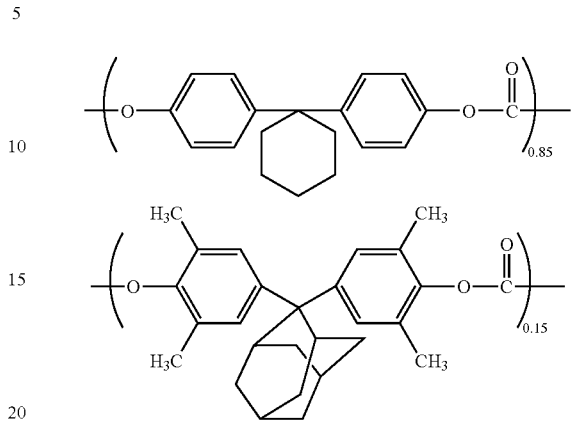

(2) Evaluation of the Optical Part-molding Material

The aromatic polycarbonate resin obtained in (1) described above was subjected to the evaluation of the aromatic polycarbonate resin film in the same manner as in (2) of Example III-1. The results thereof are shown in Table III-1.

COMPARATIVE EXAMPLE III-1

A film was obtained by the same casting method as in Example III-1, except that used was an aromatic polycarbonate resin (reduced viscosity ($\eta_{sp}/c$)=0.5 deciliter/g) produced by a publicly known interfacial polymerization method using 2,2-bis(4-hydroxyphenyl)-propane as a raw material. The aromatic polycarbonate resin obtained above was subjected to the evaluation of an aromatic polycarbonate resin film in the same manner as in (2) of Example III-1. The results thereof are shown in Table III-1 (in the table, [Example III-1] is shown as [Example 1] for convenience, and the same shall apply to the other examples and comparative examples).

TABLE III-1

|  | Example | | | Comparative |
| --- | --- | --- | --- | --- |
|  | 1 | 2 | 3 | Example 1 |
| Thickness (mm) | 0.1 | 0.1 | 0.1 | 0.1 |
| Glass transition temperature (° C.) | 238 | 282 | 207 | 145 |
| Retardation (nm) | 4 | 3 | 5 | 11 |
| Haze (%) | 0.3 | 0.2 | 0.2 | 0.3 |
| Refractive index | 1.584 | 1.590 | 1.578 | 1.585 |

INDUSTRIAL APPLICABILITY

According to the present invention, capable of being provided are an aromatic polycarbonate resin which is excellent in a transparency, a heat resistance and a mechanical strength and which has a good moldability, an effective production process for the same, an optical part-molding material which is excellent in an optical characteristic and a mechanical strength and which has a particularly high heat resistance and an optical part prepared by molding the same.

What is claimed is:

1. An aromatic polycarbonate resin which comprises a repetitive unit represented by the following Formula [II-1]:

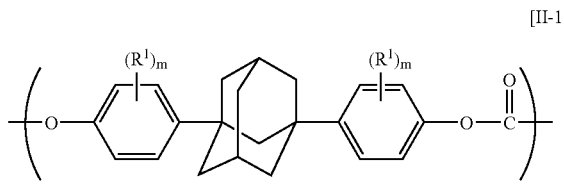

[II-1]

(wherein $R^1$ represents a group selected from the group of a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms and a fluoroalkyl group having 1 to 6 carbon atoms; and m represents an integer of 1 to 4) and in which the solution having a concentration of 0.5 g/deciliter using methylene chloride as a solvent has a reduced viscosity ($\eta_{sp}/c$) of 0.1 deciliter/g or more which is measured at 20° C.

2. The aromatic polycarbonate resin as described in claim 1, wherein $R^1$ in Formula [II-1] is an alkyl group having 1 to 6 carbon atoms.

3. An aromatic polycarbonate resin which comprises a repetitive unit (II-1) represented by the following Formula [II-2]:

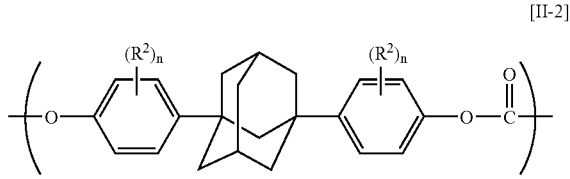

[II-2]

(wherein $R^2$ represents a group selected from the group of a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms and a fluoroalkyl group having 1 to 6 carbon atoms; and n is an integer of 1 to 4) and a repetitive unit (II-2) represented by the following Formula [II-3]:

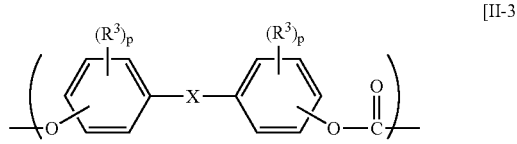

[II-3]

(wherein $R^3$ represents a group selected from the group of a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms and a fluoroalkyl group having 1 to 12 carbon atoms; and X represents a single bond, —O—, —CO—, —S—, —SO—, —SO$_2$—, —C($R^4R^5$)— (provided that $R^4$ and $R^5$ each represent independently a hydrogen atom, an alkyl group having 1 to 6 carbon atoms, a phenyl group or a trifluoromethyl group), a substituted or non-substituted cycloalkylidene group having 6 to 12 carbon atoms, a 9,9'-fluorenylidene group, a 1,8-menthanediyl group, a 2,8-menthanediyl group, a substituted or non-substituted pyrazylidene group, a substituted or non-substituted arylene group having 6 to 12 carbon atoms or —C(CH$_3$)$_2$-ph-C(CH$_3$)$_2$— (provided that ph represents a phenylene group); and p represents an integer of 0 to 4) and in which the solution having a concentration of 0.5 g/deciliter using methylene chloride as a solvent has a reduced viscosity ($\eta_{sp}/c$) of 0.1 deciliter/g or more which is measured at 20° C.

4. The aromatic polycarbonate resin as described in claim 3, wherein the repetitive unit (II-2) is represented by the following Formula [II-4]:

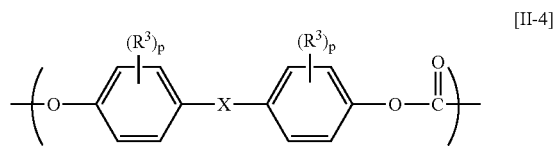

[II-4]

wherein $R^3$, X and p each represent the same as $R^3$, X and p in Formula [II-3].

5. The aromatic polycarbonate resin as described in claim 3 or 4, wherein $R^2$ in Formula [II-2] is an alkyl group having 1 to 6 carbon atoms.

6. The aromatic polycarbonate resin as described in any of claims 3 to 5, wherein X in Formula [II-3] is —C($R^4R^5$)— (provided that $R^4$ and $R^5$ each represent independently a hydrogen atom, an alkyl group having 1 to 6 carbon atoms, a phenyl group or a trifluoromethyl group), a substituted or non-substituted cycloalkylidene group having 6 to 12 carbon atoms or a 9,9'-fluorenylidene group.

7. A production process for the aromatic polycarbonate resin as described in claim 1, characterized by reacting a 1,3-bis(4-hydroxyphenyl)adamantane compound represented by the following Formula [II-5]:

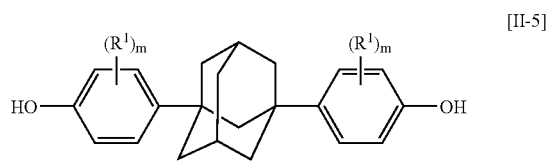

[II-5]

(wherein $R^1$ represents a group selected from the group of a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms and a fluoroalkyl group having 1 to 6 carbon atoms; and m represents an integer of 1 to 4) with a carbonic ester-forming compound.

8. The production process for the aromatic polycarbonate resin as described in claim 7, wherein the compound in which $R^1$ in Formula [II-5] is an alkyl group having 1 to 6 carbon atoms is used as the 1,3-bis(4-hydroxyphenyl)adamantane compound.

9. A production process for the aromatic polycarbonate resin as described in claim 3, characterized by reacting a 1,3-bis(4-hydroxyphenyl)adamantane compound represented by the following Formula [II-6]:

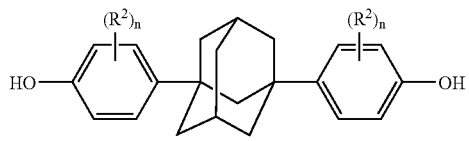

(wherein R² represents a group selected from the group of a halogen atom, an alkyl group having 1 to 6 carbon atoms, an alkoxy group having 1 to 6 carbon atoms, an aryl group having 6 to 12 carbon atoms, an aryl-substituted alkenyl group having 7 to 13 carbon atoms and a fluoroalkyl group having 1 to 6 carbon atoms; and n represents an integer of 1 to 4) and divalent phenol represented by the following Formula [II-7]:

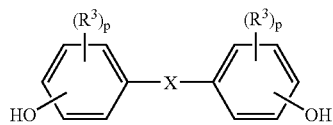

(wherein R³ represents a group selected from the group of a halogen atom, an alkyl group having 1 to 12 carbon atoms, an alkoxy group having 1 to 12 carbon atoms, an aryl group having 6 to 12 carbon atoms, an aryl-substituted alkenyl group having 7 to 13 carbon atoms and a fluoroalkyl group having 1 to 12 carbon atoms; X represents a single bond, —O—, —CO—, —S—, —SO—, —SO₂—, —C(R⁴R⁵)— (provided that R⁴ and R⁵ each represent independently a hydrogen atom, an alkyl group having 1 to 6 carbon atoms, a phenyl group or a trifluoromethyl group), a substituted or non-substituted cycloalkylidene group having 6 to 12 carbon atoms, a 9,9'-fluorenylidene group, a 1,8-menthanediyl group, a 2,8-menthanediyl group, a substituted or non-substituted pyrazylidene group, a substituted or non-substituted arylene group having 6 to 12 carbon atoms or —C(CH₃)₂—ph—C(CH₃)₂— (provided that ph represents a phenylene group); and p represents an integer of 0 to 4) with a carbonic ester-forming compound.

10. The production process for the aromatic polycarbonate resin as described in claim 9, wherein the compound in which R² in Formula [II-6] is an alkyl group having 1 to 6 carbon atoms is used as the 1,3-bis(4-hydroxyphenyl)adamantane compound.

11. The production process for the aromatic polycarbonate resin as described in claim 9 or 10, wherein a compound represented by the following Formula [II-8] is used as the divalent phenol:

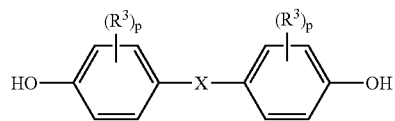

wherein R³, X and p each represent the same as R³, X and p in Formula [II-7].

12. The production process for the aromatic polycarbonate resin as described in any of claims 9 to 11, wherein used as the divalent phenol is the compound in which X in Formula [II-7] is —C(R⁴R⁵)— (provided that R⁴ and R⁵ each represent independently a hydrogen atom, an alkyl group having 1 to 6 carbon atoms, a phenyl group or a trifluoromethyl group), a substituted or non-substituted cycloalkylidene group having 6 to 12 carbon atoms or a 9,9'-fluorenylidene group.

* * * * *